United States Patent
Perttiläet al.

(10) Patent No.: US 7,274,909 B2
(45) Date of Patent: Sep. 25, 2007

(54) METHOD AND SYSTEM FOR SELECTING DATA ITEMS FOR SERVICE REQUESTS

(75) Inventors: Marko Perttilä, Pernaja (FI); Sami Ranta, Helsinki (FI); Raimo Malila, Helsinki (FI); Joakim Granholm, Helsinki (FI); Ian Nordman, Sipoo (FI); Mikko Tarkiainen, Espoo (FI); Heikki Huomo, Oulu (FI); Vesa Jutila, Espoo (FI); Petri Vesikivi, Espoo (FI); Janne Jalkanen, Helsinki (FI); Marko Vänskä, Shanghai (CN)

(73) Assignee: Nokia Corporation, Espoo (FI)

( * ) Notice: Subject to any disclaimer, the term of this patent is extended or adjusted under 35 U.S.C. 154(b) by 184 days.

(21) Appl. No.: 10/284,253

(22) Filed: Oct. 31, 2002

(65) Prior Publication Data

US 2004/0087273 A1 May 6, 2004

(51) Int. Cl.
*H04B 5/00* (2006.01)

(52) U.S. Cl. ............... 455/41.1; 455/412.1; 455/414.2; 340/10; 340/572.1

(58) Field of Classification Search ............... 455/41.1, 455/41.2, 41.3, 552.1, 412.1, 414.2, 414.3, 455/456.3; 340/505, 572.1, 10.1; 709/202, 709/203, 217
See application file for complete search history.

(56) References Cited

U.S. PATENT DOCUMENTS

| | | |
|---|---|---|
| 3,916,160 A | 10/1975 | Russo et al. |
| 3,971,917 A | 7/1976 | Maddox et al. |
| 4,692,603 A | 9/1987 | Brass et al. |
| 4,728,783 A | 3/1988 | Brass et al. |
| 4,745,269 A | 5/1988 | Van Gils |
| 4,754,127 A | 6/1988 | Brass et al. |
| 4,782,221 A | 11/1988 | Brass et al. |
| 4,794,239 A | 12/1988 | Allais |
| 4,874,936 A | 10/1989 | Chandler et al. |
| 4,896,029 A | 1/1990 | Chandler et al. |
| 4,924,078 A | 5/1990 | Sant'Anselmo et al. |
| 4,939,354 A | 7/1990 | Priddy et al. |
| 4,958,064 A | 9/1990 | Kirkpatrick |
| 4,972,475 A | 11/1990 | Sant'Anselmo |
| 4,998,010 A | 3/1991 | Chandler et al. |

(Continued)

FOREIGN PATENT DOCUMENTS

| | | |
|---|---|---|
| DE | 10042914 | 4/2001 |
| EP | 0801512 | 10/1997 |

(Continued)

OTHER PUBLICATIONS

U.S. Appl. No. 10/180,267, filed Jun. 26, 2002, Heikki Huomo et al.

(Continued)

*Primary Examiner*—Lee Nguyen
(74) *Attorney, Agent, or Firm*—Morgan & Finnegan, LLP

(57) ABSTRACT

A method and system locate a transponder that has an associated identifier and content data, at a location substantially accessible to a user of the mobile terminal. The transponder is activated by the mobile terminal with a wireless signal. In response, the mobile terminal receives at least the identifier and the content data from the activated transponder at the mobile terminal. From the received identifier and/or content data, the method and system select one or more of the stored data items according to one or more criteria.

44 Claims, 10 Drawing Sheets

U.S. PATENT DOCUMENTS

| | | |
|---|---|---|
| 5,053,609 A | 10/1991 | Priddy et al. |
| 5,118,369 A | 6/1992 | Shamir |
| 5,124,536 A | 6/1992 | Priddy et al. |
| 5,153,148 A | 10/1992 | Batterman et al. |
| 5,189,292 A | 2/1993 | Batterman et al. |
| 5,206,490 A | 4/1993 | Petigrew et al. |
| 5,223,701 A | 6/1993 | Batterman et al. |
| 5,243,655 A | 9/1993 | Wang |
| 5,250,789 A | 10/1993 | Johnsen |
| 5,331,176 A | 7/1994 | Sant'Anselmo et al. |
| 5,369,261 A | 11/1994 | Shamir |
| 5,378,883 A | 1/1995 | Batterman et al. |
| 5,412,193 A | 5/1995 | Swartz et al. |
| 5,449,895 A | 9/1995 | Hecht et al. |
| 5,478,989 A | 12/1995 | Shepley ............... 235/375 |
| 5,493,692 A | 2/1996 | Theimer et al. ........... 455/26.1 |
| 5,512,739 A | 4/1996 | Chandler et al. |
| 5,521,372 A | 5/1996 | Hecht et al. |
| 5,581,630 A | 12/1996 | Bonneau, Jr. |
| 5,591,956 A | 1/1997 | Longacre, Jr. et al. |
| 5,612,524 A | 3/1997 | Sant'Anselmo et al. |
| 5,629,981 A | 5/1997 | Nerlikar ............... 380/25 |
| 5,642,203 A | 6/1997 | Sawano et al. |
| 5,642,303 A | 6/1997 | Small et al. |
| 5,666,214 A | 9/1997 | MacKinlay et al. |
| 5,682,142 A | 10/1997 | Loosmore et al. ......... 340/572 |
| 5,764,736 A | 6/1998 | Shachar et al. ......... 379/93.09 |
| 5,799,091 A | 8/1998 | Lodenius |
| 5,811,776 A | 9/1998 | Liu |
| 5,850,187 A | 12/1998 | Carrender et al. |
| 5,886,646 A | 3/1999 | Watanabe et al. |
| 5,929,778 A | 7/1999 | Asama et al. |
| 5,933,829 A | 8/1999 | Durst et al. |
| 5,948,040 A | 9/1999 | DeLorme et al. |
| 5,949,335 A | 9/1999 | Maynard ............... 340/572.1 |
| 5,959,530 A | 9/1999 | Lupien, Jr. et al. ...... 340/568.1 |
| 5,970,469 A | 10/1999 | Scroggie et al. |
| 5,978,773 A | 11/1999 | Hudetz et al. |
| 5,979,757 A | 11/1999 | Tracy et al. |
| 6,023,241 A | 2/2000 | Clapper |
| 6,026,375 A | 2/2000 | Hall et al. |
| 6,029,064 A | 2/2000 | Farris et al. |
| 6,055,442 A | 4/2000 | Dietrich |
| 6,058,304 A | 5/2000 | Callaghan et al. |
| 6,108,656 A | 8/2000 | Durst et al. |
| 6,138,009 A | 10/2000 | Birgerson |
| 6,154,745 A | 11/2000 | Kari et al. ................. 707/100 |
| 6,176,427 B1 | 1/2001 | Antognini et al. |
| 6,177,860 B1 | 1/2001 | Cromer et al. ............. 340/10.1 |
| 6,196,466 B1 | 3/2001 | Schuessler |
| 6,199,048 B1 | 3/2001 | Hudetz et al. |
| 6,223,988 B1 | 5/2001 | Batterman et al. |
| 6,249,226 B1 | 6/2001 | Harrison et al. |
| 6,259,367 B1 | 7/2001 | Klein ...................... 340/572.1 |
| 6,295,506 B1 | 9/2001 | Heinonen et al. |
| 6,308,203 B1 | 10/2001 | Itabashi et al. ............. 709/217 |
| 6,311,058 B1 | 10/2001 | Wecker et al. |
| 6,314,457 B1 | 11/2001 | Schena et al. |
| 6,327,570 B1 | 12/2001 | Stevens |
| 6,332,062 B1 | 12/2001 | Phillips et al. ................. 399/12 |
| 6,356,543 B2 | 3/2002 | Hall et al. |
| 6,370,389 B1 | 4/2002 | Isomursu et al. |
| 6,389,278 B1 | 5/2002 | Singh |
| 6,397,057 B1 | 5/2002 | Malackowski et al. |
| 6,401,085 B1 | 6/2002 | Gershman et al. |
| 6,446,004 B1 | 9/2002 | Cao et al. |
| 6,446,208 B1 | 9/2002 | Gujar et al. ................. 713/185 |
| 6,448,979 B1 | 9/2002 | Schena et al. |
| 6,456,039 B1 | 9/2002 | Lauper et al. ............... 320/107 |
| 6,462,660 B1 | 10/2002 | Cannon et al. |
| 6,470,096 B2 | 10/2002 | Davies et al. |
| 6,491,217 B2 | 12/2002 | Catan |
| 6,512,919 B2 | 1/2003 | Ogasawara |
| 6,542,933 B1 | 4/2003 | Durst, Jr. et al. |
| 6,577,901 B2 | 6/2003 | Thompson |
| 6,587,684 B1 | 7/2003 | Hsu et al. |
| 6,611,673 B1 | 8/2003 | Bayley et al. |
| 6,622,017 B1 | 9/2003 | Hoffman |
| 6,641,051 B1 | 11/2003 | Illowsky et al. |
| 6,647,269 B2 | 11/2003 | Hendrey et al. |
| 6,650,761 B1 | 11/2003 | Rodriguez et al. |
| 6,678,425 B1 | 1/2004 | Flores et al. |
| 6,687,793 B1 | 2/2004 | Thomas et al. |
| 6,753,883 B2 | 6/2004 | Schena et al. |
| 6,996,537 B2 | 2/2006 | Minear et al. |
| 7,135,976 B2 | 11/2006 | Neff et al. |
| 2001/0011247 A1 | 8/2001 | O'Flaherty et al. ........... 705/39 |
| 2001/0018349 A1 | 8/2001 | Kinnunen et al. |
| 2001/0041566 A1 | 11/2001 | Xanthos et al. ............. 455/423 |
| 2002/0039909 A1 | 4/2002 | Rankin ....................... 455/558 |
| 2002/0086680 A1 | 7/2002 | Hunzinger |
| 2002/0087392 A1 | 7/2002 | Stevens |
| 2002/0087529 A1 | 7/2002 | Dutcher et al. |
| 2002/0094797 A1 | 7/2002 | Marshall et al. ............ 455/403 |
| 2002/0095456 A1 | 7/2002 | Wensheng |
| 2002/0121544 A1 | 9/2002 | Ito et al. |
| 2002/0122055 A1 | 9/2002 | Parupudi et al. |
| 2002/0130178 A1 | 9/2002 | Wan et al. |
| 2002/0151326 A1 | 10/2002 | Awada et al. |
| 2002/0165008 A1 | 11/2002 | Sashihara et al. |
| 2003/0017848 A1 | 1/2003 | Engstrom et al. |
| 2003/0019929 A1 | 1/2003 | Stewart et al. .............. 235/385 |
| 2003/0030542 A1 | 2/2003 | von Hoffmann ........... 340/5.61 |
| 2003/0056019 A1 | 3/2003 | Kehr et al. .................. 709/310 |
| 2003/0074566 A1 | 4/2003 | Hypponen |
| 2003/0088496 A1 | 5/2003 | Piotrowski |
| 2003/0191839 A1 | 10/2003 | Seljesth |
| 2003/0194989 A1 | 10/2003 | Guion |
| 2004/0033798 A1 | 2/2004 | Robin et al. |
| 2004/0087273 A1 | 5/2004 | Perttila et al |
| 2004/0189635 A1 | 9/2004 | Hoisko |
| 2004/0203693 A1 | 10/2004 | Mchta et al. |

FOREIGN PATENT DOCUMENTS

| | | |
|---|---|---|
| EP | 0853287 | 7/1998 |
| EP | 1059599 | 12/2000 |
| EP | 1130495 | 9/2001 |
| EP | 1130933 | 9/2001 |
| EP | 1 197 905 A2 | 4/2002 |
| FI | 2002/2288 | 12/2002 |
| GB | 2 246 491 A | 1/1992 |
| KR | 2002-0043631 | 6/2002 |
| KR | 2002-0080162 | 10/2002 |
| RU | 2 116 008 C1 | 7/1998 |
| WO | WO 97/10558 | 3/1997 |
| WO | WO 97/17790 | 5/1997 |
| WO | WO 97/28736 | 8/1997 |
| WO | WO 97/41654 | 11/1997 |
| WO | WO 97/46960 | 12/1997 |
| WO | WO 98/35469 | 8/1998 |
| WO | WO 99/17230 | 4/1999 |
| WO | WO 99/30257 | 6/1999 |
| WO | WO 00/16507 | 3/2000 |
| WO | WO 00/62260 A1 | 10/2000 |
| WO | WO01/06507 | 1/2001 |
| WO | WO 01/17297 | 3/2001 |
| WO | WO01/20542 | 3/2001 |
| WO | WO 01/25985 | 4/2001 |
| WO | WO01/39103 | 5/2001 |
| WO | WO01/39108 | 5/2001 |
| WO | WO01/45038 | 6/2001 |

| | | |
|---|---|---|
| WO | WO 01/45061 A2 | 6/2001 |
| WO | WO01/45319 | 6/2001 |
| WO | WO 01/47291 | 6/2001 |
| WO | WO01/73687 | 10/2001 |
| WO | WO 01/74011 A1 | 10/2001 |
| WO | WO01/74406 | 10/2001 |
| WO | WO 01/75815 A2 | 10/2001 |
| WO | WO01/99410 | 12/2001 |
| WO | WO 02/07474 A1 | 1/2002 |
| WO | WO 02/33669 A1 | 4/2002 |
| WO | WO 2004/003829 | 1/2004 |
| WO | WO 2004/027689 | 4/2004 |

OTHER PUBLICATIONS

U.S. Appl. No. 10/179,237, filed Jun. 26, 2002, Jarkko Sairanen et al.

U.S. Appl. No. 10/174,405, filed Jun. 17, 2002, Marko Vanska, et al.

U.S. Appl. No. 10/191,735, filed Jul. 8, 2002, Marko Vänskä et al.

"vCard: The Electronic Business Card", Version 2.1, www.imc.org/pdi/vcardwhite.html, Download Date Feb. 5, 2002, 5 pages.

"vCard Overview", www.imc.org/pdi/vcardoverview.html, Download Date Feb. 5, 2002, 3 pages.

"Products Using vCard and vCalendar Technology", www.imc.org/pdi/pdiprodslist.html, Download Date Feb. 5, 2002, 9 pages.

Mandato D. et al., "CAMP: A Context–Aware Mobile Portal", IEEE Communications Magazine, vol. 40, No. 1, Jan. 2002, pp. 2, 4 and 90–97.

Electronic User's Guide for Nokia 6310i, 9354260, Issue 1, 2002, pp. 1–117.

"Radio Frequency Identification RFID—A Basic Primer", Automatic Identification Manufacturers (AIM) Inc. White Paper, Ver. 1.2, AIM Inc WP–98/002R2, Aug. 23, 2001, pp. 1–17.

International Search Report mailed on Feb. 23, 2004, in corresponding International Application No. PCT/IB03/04634.

U.S. Appl. No. 10/882,619, filed Jul. 2, 2004, Suomela et al.

"CodeXML Router —Bluetooth Edition", http://www.gocode.com/products/coderouter.htm, 2 pp., printed on Jul. 2, 2004.

"CodeXML Bluetooth Modem", product sheets (2 pp.), printed from www.gocode.com on Jul. 2, 2004.

"CodeXML Router —Bluetooth Edition", product sheets (2 pp.), printed from www.gocode.com on Jul. 2, 2004.

"Code Router BE Diagram", http://www.gocode.com/routerdiagram.htm, 1 page., printed on Jul. 2, 2004.

"CodeXML Maker Pro", http://www.gocode.com/products/maker.htm, 1 page., printed on Jul. 2, 2004.

"CodeXML Marker Pro Screen", http://www.gocode.com/products/images/makerpro–screen.jpg, 1 page., printed on Jul. 2, 2004.

"CodeXML Bluetooth Modem", http://www.gocode.com/products/modem.htm, 1 page., printed on Jul. 2, 2004.

"Code Router BE Use Case Diagram", http://www.gocode.com/routerdiagram2.htm, 1 page., printed on Jul. 2, 2004.

"GoCode —Secure Data Solutions", http://www.gocode.com/products/gocode.htm, 3 pages, printed on Jul. 2, 2004.

NeoMedia Technologies Inc., "Patent Infrigement Lawsuit Brought by NeoMedia Against AirClic Inc., Scanbuy, Inc., and LScan Technologies Inc.", dated Jan. 26, 2004, 2 pages. http://www.neom.com/corporate/press/2004/20040126.jsp, printed Apr. 15, 2004.

Symbol Technologies Ltd., "Solutions 8 Fastfrog Case Study", http://www.symbol.com/uk/News/solutions_8_fastfrog_case_stud.html, 2 pages., printed on Apr. 15, 2004.

"CueCat Barcode scanner from Digital Convergence Information", http://www.cuecat.com, 2 pages, printed on Sep. 16, 2005.

iTCaseStudies.com "Uniting Space and Place for Future Growth", 4 pp., http://www.itcasestudies.com/case/ret37.html, printed on Apr. 15, 2004.

Stephen Satchell, "CueCat Principles of Operation", 4 pp., http://www.fluentaccess.com/wtpapers/cuecat, printed on Apr. 15, 2004.

Symbol Technologies, Inc. "Symbol Technologies'Consumer Scanners Provide Mall Shoppers With Internet Shopping Experience", dated Dec. 6, 1999, 3 pp., http://www.symbol.com/news/pressreleases/press_release_retail_consumer.html, printed on Apr. 15, 2004.

NeoMedia Technologies, "Virgin Entertainment, Virgin Megastore Online and Virgin Mega Store Are Charged with Patent Infringment by NeoMedia Technologies, Inc.,", dated Jan. 5, 2004, 2 pages, http://www.neom.com/corporate/press/2004/20040105.jsp, printed on Apr. 15, 2004.

12snap UK Ltd. "12snap That's Mobile Marketing", 38 pp., http://www.12snap.com/uk/index2.html, printed on Apr. 15, 2004.

"UMTS and Mobile Computing"; Alexander Joseph Huber & Josef Franz Huber., Mar. 2002, Artech House Mobile Communications Series; pp. 170–187 and 231–232.

U.S. Appl. No. 10/728,915, filed Dec. 8, 2003, Engestrom, et al.

U.S. Appl. No. 10/286,221, filed Nov. 1, 2002, Marko Vanska, et al.

U.S. Appl. No. 10/291,038, filed Nov. 8, 2002, Marko Vanska, et al.

Aim White Paper: "Introduction to Radio Frequency Identification (RFID)–A Basic Primer", The Association of the Automatic Idnetification and Data Caputure Industry, [Online] Aug. 23, 2001, pp. 1–17; htt://www.aimglobal.org/technologies/rfid/resources/RFIDPrimer.pdf>.

Korean Office Action dated Jul. 25, 2005.

| OCTET | DESCRIPTION |
|---|---|
| 0 | ID NUMBER |
| 1 | ID NUMBER |
| 2 | CONTENT TYPE |
| 3 | CONTENT TYPE |
| 4 | TARIFF INFORMATION |
| 5 | TARIFF INFORMATION |
| 6 | LENGTH OF CONTENT |
| 7 + LENGTH | CONTENT OF RFID TAG |
| ... | CONTENT OF RFID TAG |
| | CONTENT OF RFID TAG |
| n-2 | CERTIFICATE FIELD (OPTIONAL) |
| n-1 | CYCLIC REDUNDANCY CHECK SUM |
| n | CYCLIC REDUNDANCY CHECK SUM |

FIG. 5

METHOD AND SYSTEM FOR SELECTING DATA ITEMS FOR SERVICE REQUESTS

FIELD OF THE INVENTION

This invention relates in general to mobile communications, and more particularly to a system, method, and apparatus for locating available information and services/applications via mobile terminals using radio frequency identification technology.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

An incredible amount of content, application, services, etc. is already available for use on wireless devices. However, the quantity of information that will be accessible to mobile terminals will increase significantly in the coming years, as further technological advances will continue to diminish the gap between desktop and wireless units. While access to this plethora of information is exciting to the mobile world, locating the desired information and utilizing the various access methods can become burdensome to the casual mobile terminal user. In fact, current mobile data services have taken off relatively slowly, partly due to the inconvenient and complex service discovery solutions offered for users of existing mobile phones.

Current mobile data service discovery and initiation has been accomplished in a variety of ways. Browsing using the Wireless Application Protocol (WAP) generally involves starting from an operator preset service portal, and browsing forward by clicking various menus. Other current mobile data service discovery includes searching for the information required for sending messages, such as Short Message Service (SMS) messages, from various sources such as advertisements. For example, users may be required to search advertisements to find content strings and application numbers. Another existing service discovery method involves mobile terminal configuration settings. Currently, this is often performed by initiating the configuration from a web site or requesting it personally.

Furthermore, some applications or services that might be available for use on a mobile device may be of little value, until the user is physically placed in a particular location where such applications and/or services may be very useful. This has led to a concept generally referred to as location-based services (LBS). However, existing LBSs generally require some form of browsing, messaging, or other specific act on the part of the user, and does not relieve the user of any of the disadvantages of the prior art listed above.

Accordingly, there is a need in the communications industry for a manner of reducing the mobile terminal users' burden of discovering and initiating mobile data services. The present invention significantly reduces the need for the user to sift through numerous network sites, advertisements, documents, etc. to locate services and information when the user is in a situation/location where there is a high probability that the user will want a certain type of information. The present invention fulfills these and other needs, and offers other advantages over the prior art.

SUMMARY OF THE INVENTION

The present invention is directed to a system and method in a mobile terminal for selecting data items to be included in a service request through an encounter with a transponder, where the mobile terminal stores one or more data items. The method and system locate a transponder that has an associated identifier and content data, at a location substantially accessible to a user of the mobile terminal. The transponder is activated by the mobile terminal with a wireless signal. In response, the mobile terminal receives at least the identifier and the content data from the activated transponder at the mobile terminal. The mobile terminal may store the received identifier and content data in memory upon receipt.

From the received identifier and/or content data, the method and system select one or more of the stored data items according to one or more criteria. These one or more criteria include at least one of: the received identifier, the received content data, one or more conditions associated with the stored data items, and one or more conditions set by the user of the mobile terminal. These conditions may be in the form of cards and may be set by the user of the mobile terminal before the mobile terminal receives the identifier and the content data from the activated transponder.

This selection may be performed by a selection application that is stored at the mobile terminal. The selection application may be initiated by a user, or automatically, where the selected information may be provided to the user for approval. If approved, the service request based on the selected data items may be generated.

The method and system may further generate the service request based on the one or more selected data items, and send the service request to a service provider. The service request may be, for example, a Short Message Service (SMS) push request, a Multimedia Message Service (MMS) push request, or a Wireless Application Protocol (WAP) request.

Further features and advantages of the present invention will become apparent from the following description.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 5 illustrates a general diagram of an exemplary tag information block;

DETAILED DESCRIPTION OF THE PREFERRED EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides an apparatus, system, and method for locating available information and services/applications via mobile terminals, as well as facilitating receipt of other information such as configuration/provisioning information, via electromagnetic/electrostatic coupling technology. In one embodiment, this electromagnetic/electrostatic coupling is implemented in the radio frequency portion of the electromagnetic spectrum, using radio frequency identification (RFID). A mobile device is equipped with an RFID reader, and transponders or "tags" are activated by radio frequency waves emitted by the mobile terminal. When activated, the tag transmits information to the mobile terminal reader. In one embodiment of the invention, the tag provides an address(es), e.g., a Uniform Resource Locator (URL), to content desired by the user.

The content itself may also be provided via the tag. In this manner, "physical browsing" is facilitated where the mobile terminal user comes in proximity to a tag that provides information that would otherwise require browsing or other means for searching for such information. The invention also provides a convenient manner of provisioning mobile terminals or providing other configuration information, by providing this provisioning and/or configuration information via RFID tags.

Figure 1:
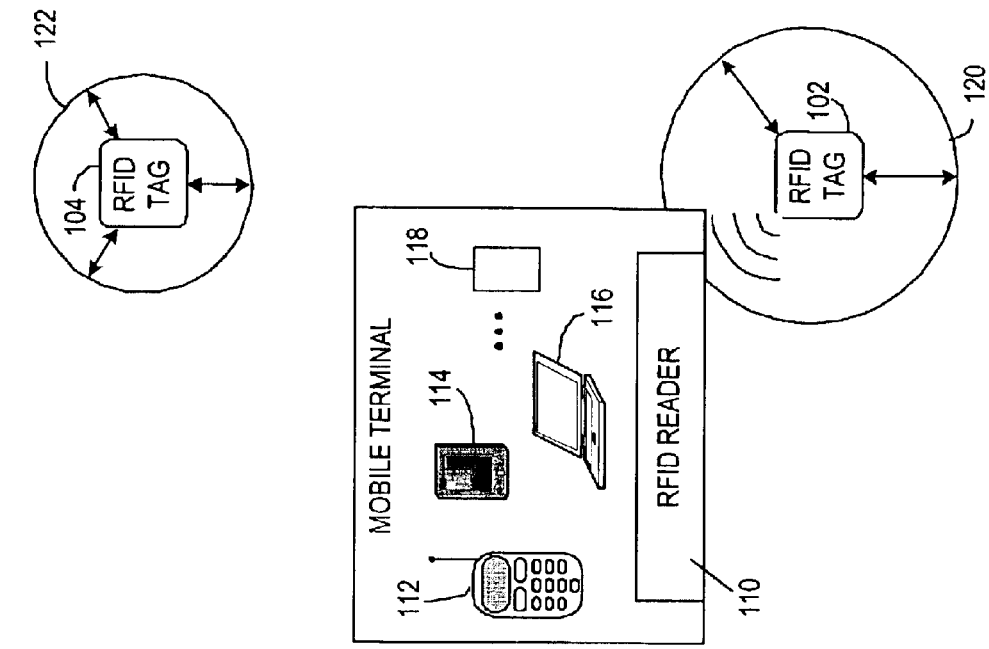
FIG. 1 is a block diagram illustrating an exemplary embodiment of the service discovery and initiation, i.e., "physical browsing," in accordance with the present invention.
Figure 1:
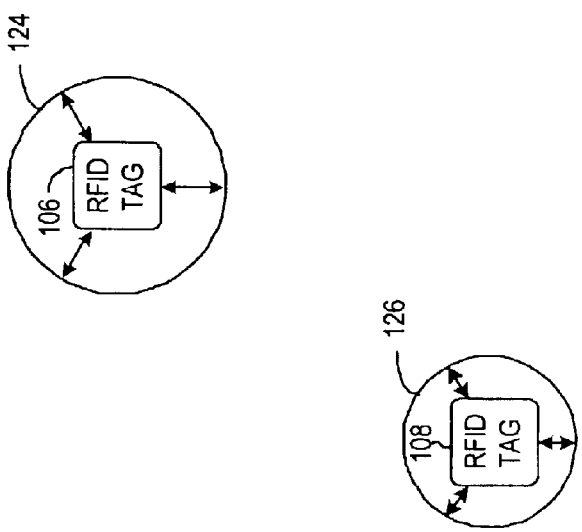

FIG. 1 is a block diagram illustrating an exemplary embodiment of the service discovery and initiation, i.e., "physical browsing," in accordance with the present invention. In the illustrated embodiment, a mobile terminal 100 moves from place to place, and actions, applications, services, etc. can be initiated when the mobile terminal 100 comes within a certain range of a transponder. More particularly, one embodiment of the invention involves providing various transponders or "tags" based on radio frequency identification (RFID) technology. FIG. 1 depicts a number of such tags, namely RFID tags 102, 104, 106, 108. When the mobile terminal 100 comes within a certain range of a tag, the RFID reader 110 associated with the mobile terminal will read the information from the respective RFID tag. Any type of wireless/mobile terminal 100 equipped with an RFID reader 110 in accordance with the present invention may be used, such as a cellular telephone 112, a personal digital assistant (PDA) 114, a notebook or laptop computer 116, or any other type of wireless terminal represented by device 118.

RFID technology utilizes electromagnetic or electrostatic coupling in the radio frequency (RF) portion of the electromagnetic spectrum. The RFID reader 110 includes at least an antenna and transceiver (not shown in FIG. 1). An RF signal is transmitted from the RFID reader 110 that activates the tags 102, 104, 106, 108 when touched to, or within a predetermined range of, the tags. When a tag has been activated, it transmits information back to the RFID reader 110. More particularly, in the case of a passive tag (described below), the tag may be energized by a time-varying electromagnetic RF wave generated by the RFID reader 110. When the RF field passes through the antenna coil associated with the tag, a voltage is generated across the coil. This voltage is ultimately used to power the tag, and make possible the tag's return transmission of information to the reader, sometimes referred to as backscattering.

Using this information, the RFID reader 110 can direct the mobile terminal 100 to perform an action identified from the received information. One advantage of RFID is that it does not require direct contact, although direct contact with an RFID tag can occur, and in some instances may be required. The frequency employed will at least partially dictate the transmission range of the reader/tag link. The required proximity of the mobile terminal 100 to a tag can range from a very short range (touching or near touching) to many meters, depending on the frequency employed and the power output. Each of the RFID tags shown in FIG. 1 illustrate a range for that RFID tag. For example, when the mobile terminal comes within a range 120 of RFID tag 102, the tag 102 can receive the signal from the RFID reader 110 and respond with the desired information. Other ranges 122, 124, 126 are illustrated for RFID tags 104, 106, 108 respectively.

It should also be noted that one embodiment of the invention involves a tag having substantially no transmission range, but rather may include contacts that physically couple to corresponding contacts on the mobile terminal 100. While such an embodiment will be unable to avail itself of some of the benefits of RFID or other analogous technology, such an embodiment is feasible in connection with the present invention.

Any type of RFID tag may be used in connection with the present invention. For example, RFID tags can be either active or passive. Active tags require an internal battery and are often read/write tags. Passive tags do not require a dedicated power source, but rather obtain operating power generated from the reader. Further, tags may come in a variety of shapes and sizes, but are generally based on a custom designed silicon integrated circuit. Any transponder/tag may be used in connection with the present invention, and the tag type, size, etc. depends on the particular environment and purpose in which physical browsing in accordance with the invention will be employed.

Any number of such tags can be positioned at various locations in which a user may physically encounter. For example, such tags can be located at retail stores, hotels, restaurants, night clubs, bus stops, train stations and airports, offices, taxis, conference centers, etc. Any place where it is advantageous for the tag provider to provide information and/or convenient for the mobile terminal user to obtain such information is a candidate for a tag location in accordance with the present invention. For example, a restaurant may embed a tag outside its front door or in an entry door frame that provides the restaurant menu. Alternatively, the tag may provide an address, such as a Uniform Resource Locator (URL), to the restaurant's site where reservation and/or current seating wait times may be obtained. As another example, a night club may use such a tag to provide taxi service information, such as taxi service contact information, or even to initiate a taxi request. Such a tag can be attached or embedded into the night club door frame, tables, or a dedicated taxi station or kiosk located therein. The night club can provide one or more taxi service contact numbers of the best or closest taxi service.

Also, tags may be placed on, for example, a poster providing a map. The map can be the map of the surroundings, of the shopping mall etc. Based on a tag interactions, services corresponding to the location of the tag on the map may be obtained.

As can be seen from the foregoing, the possibilities for such physical browsing are virtually limitless. By utilizing physical tags in this manner, mobile terminal users are relieved of the burden of having to "electronically" browse for certain information that is likely to be associated at that physical location. For example, because essentially all restaurants have menus and possible seating wait times, it is foreseeable that a person will want to know that information while physically near the restaurant. Rather than requiring a passer-by to go into the restaurant to ask for this information, or requiring the person to electronically browse for this information via his/her wireless device, it can simply be provided at the restaurant site, i.e., the passer-by's current location.

Figure 2A:
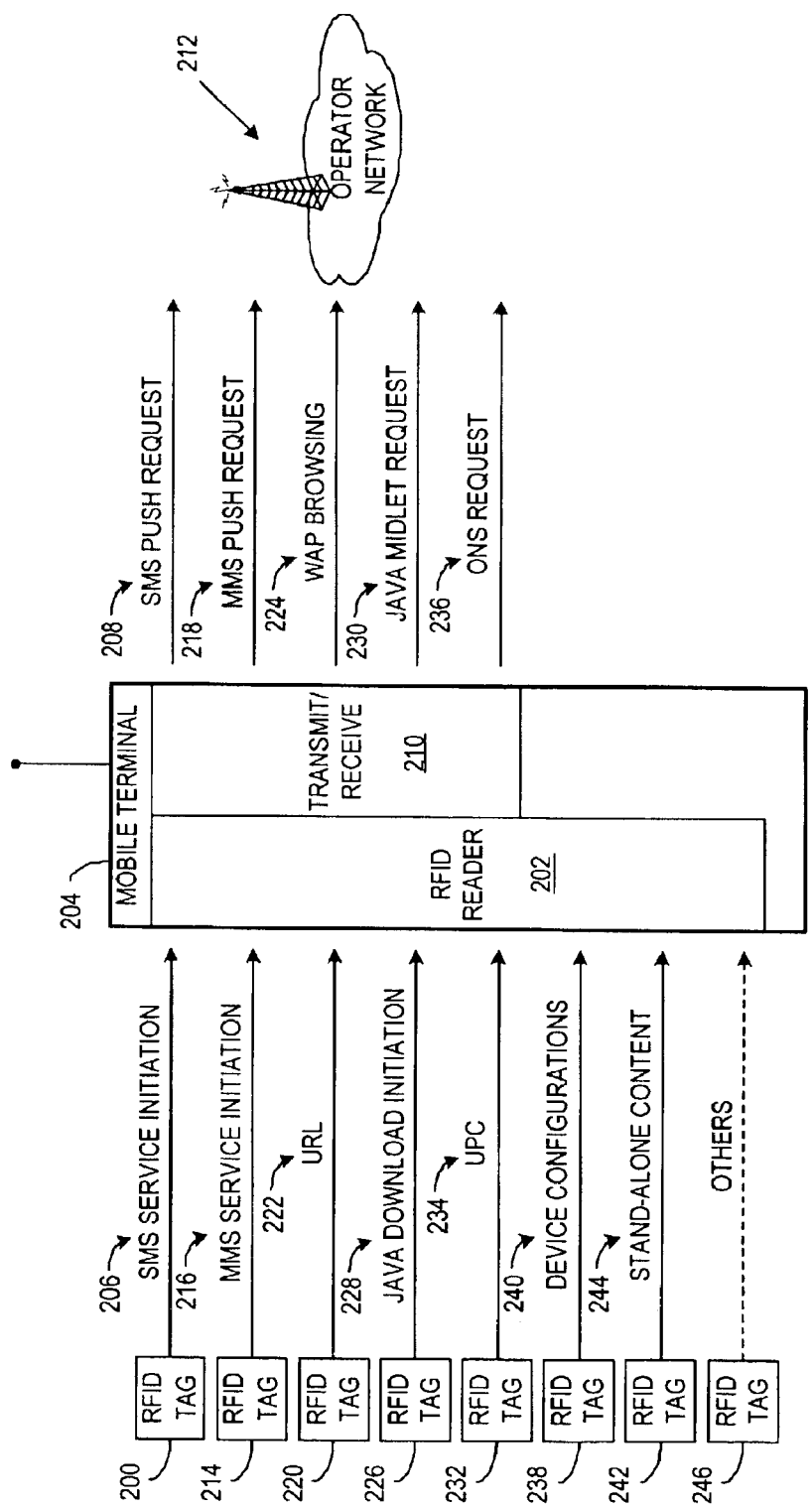
FIGS. 2A and 2B illustrate a number of representative service types that may be initiated using RFID physical browsing in accordance with the present invention.

FIG. 2A illustrates a number of representative service types that may be initiated using RFID physical browsing in accordance with the present invention. For purposes of facilitating an understanding of this aspect of the invention, each representative service type is shown as being associated with a different RFID tag. RFID tag 200 is depicted as initiating a first service type, namely Short Messaging Service (SMS). Assuming for purposes of discussion that the tag 200 is a passive tag, the RFID reader 202 associated with the mobile terminal 204 provides a signal, and when the RFID tag 200 receives the signal, it returns an SMS service initiation response 206. As will be described more fully below, the information associated with the SMS service initiation response 206 includes an identifier to identify an application on the mobile terminal 204 to initiate, and content. A reader application in the mobile terminal 204 feeds the content portion of the tag response 206 into another application on the mobile terminal 204 based on the identifier. In this embodiment, an SMS application will be invoked, and an SMS message and premium service SMS number will be sent to the service provider, depicted by the SMS push request 208 sent via the transceiver 210 to the operator network 212.

Another representative service type that can be initiated is Multimedia Message Service (MMS). RFID tag 214 provides an MMS service initiation response 216 in the manner described above. The reader application in the mobile terminal 204 feeds the content portion of the tag response 216 to an application on the mobile terminal based on the identifier associated with the tag 214. An MMS application will be invoked, inviting a premium MMS by way of, for example, an MMS push request 218 sent to the operator network 212.

Wireless Application Protocol (WAP) browsing, or an analogous protocol facilitating mobile browsing, is another representative service type that can be initiated in accordance with the invention. As is known in the art, WAP is a set of protocols that accounts for characteristics and functionality of both Internet standards and standards for wireless services, and integrates the Internet and other networks with wireless network platforms. WAP thus bridges the gap between the wireline Internet paradigm and the wireless domain, to allow wireless device users to enjoy the benefits of the Internet across both platforms. In an embodiment where WAP browsing is the service type, the tag 220 provides an application identifier to a WAP browsing application on the mobile terminal 204, along with content including an address, e.g., URL 222. Upon invoking the WAP browser, the mobile terminal will connect to the specified URL by way of WAP browsing 224. The mobile terminal 204 may use a preset WAP gateway address to connect to the specified URL.

Another representative service type is a Java download (or analogous programming technology). The tag 226 provides a Java download initiation response 228 in response to the signal provided by the mobile terminal 204, which is read by the RFID reader 202. The RFID reader 202 provides the content portion to an application on the mobile terminal 204, ultimately leading to the transmission of a Java (for example) application request such as a Java MIDlet request 230, where a MIDlet generally refers to a small Java application (e.g., applets) that runs on compliant mobile devices. Once the Java application is downloaded, it can be executed on the mobile terminal 204. It should be recognized that the present invention is equally applicable to other analogous programming technologies, and Java is referred to herein as a representative example. Thus, as used in the specification and claims provided herein, references to Java applications are intended to include other similar programming languages that can be used on mobile terminals.

An ONS request is another example of a service type that can be initiated in accordance with the invention. An RFID tag 232 can provide content such as a Universal Product Code (UPC) 234, or an analogous code such as an Electronic Product Code (EPC). The identifier associated with the tag 232 information can initiate a program that provides a request to the operator network 212, such as an Object Naming Service (ONS) request 236. An ONS is a service available via the operator network 212 for looking up UPCs and/or EPCs from which information can then be provided. Therefore, such a request 236 will ultimately lead to the network 212 providing the requested information back to the mobile terminal.

The service types described thus far involve some communication with an operator network 212. However, the present invention is applicable to situations where no ultimate network connection is involved. RFID tag 238 illustrates one such situation, where device configurations 240 are provided to the mobile terminal 204. For example, these configurations may be initial settings for WAP, SMS, MMS, etc. or other provisioning information. For example, an RFID tag 238 may be provided to a purchaser of a mobile telephone along with the new mobile telephone. The tag 238 may be provided to the user at the time of purchase, separate from the mobile telephone packaging, as a theft-protection mechanism where the tag 238 is required to provision the mobile device. Alternatively, such a tag can be provided inside, or integral with the packaging itself. The mobile device can then be provisioned or otherwise configured for certain uses via information provided by the RFID tag 238.

For example, the tag 238 identifier can identify the application on the mobile terminal 204 that is to be activated, and the content associated with the tag 238 can provide the provisioning information, which may include initial WAP, SMS, MMS, EMS, etc. information. Alternatively, the RFID tag 238 may provide a URL to direct the user to a provisioning/configuration site. Other configurations for the mobile terminal can also be provided by the tag 238. A person could purchase an RFID sticker that includes certain mobile terminal configurations, such as user profiles, wall paper, user-interface "skins," FM radio channels, Digital Video Broadcast-terrestrial (DVB-T) keys, etc.

The provisioning/configuration services initiated by the RFID tag 238 may include downloading logos or icons with associated contact information. The user of the portable terminal 204 may store these icons and the associated information on his mobile device. The stored data may be modified by his profile/context data to personalize the service. One or more of the applications, which may be initialized by the RFID tag, can be presented to the user as icons on the display of the mobile device. When a RFID tag is read, the corresponding personalized service is presented to the user as an icon and the user may then request for the service. The icon may be removed from the display, when the conditions set by the profile/context data are not fulfilled any more.

Further, a tag 242 can similarly be used to provide stand-alone content 244 to the mobile terminal 204. This content may be, for example, text, images, business cards, etc. In one embodiment, the content is provided to the RFID reader 202 via a smart message interface, which is described more fully below.

Figure 2B:
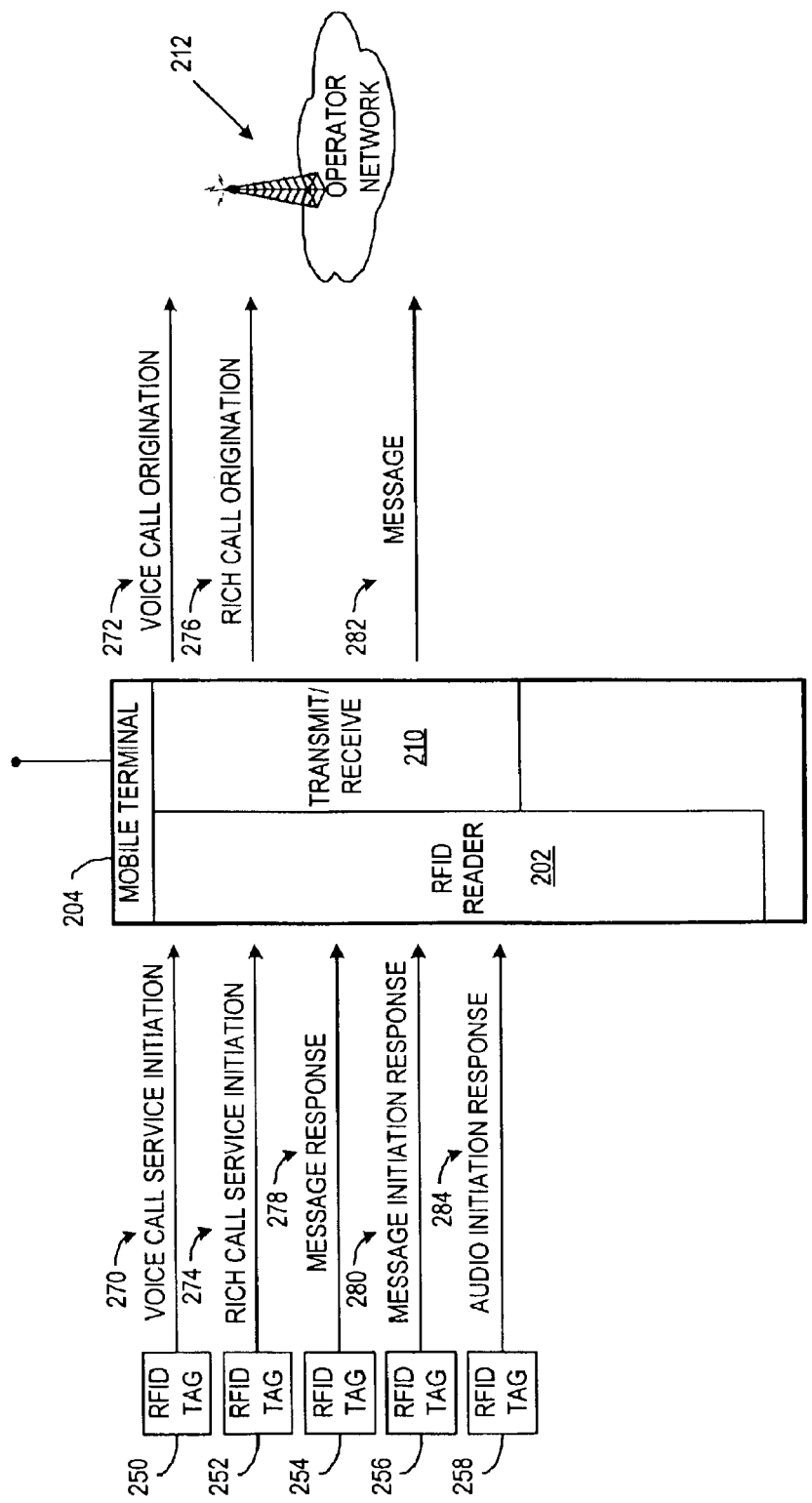

FIG. 2B illustrates further examples of representative service types that may be initiated using RFID physical browsing. As in FIG. 2A, each representative service type is shown as being associated with a different RFID tag.

As shown in FIG. 2B, voice call placement is a service type that may be initiated. For instance, upon receiving a signal from the mobile terminal 204, a RFID tag 250 initiates a voice call initiation response 270. The information associated with the voice call initiation response 270 includes an identifier to identify an application on the mobile terminal 204 to initiate, and content. A reader application in the mobile terminal 204 feeds the content portion of the tag response 270 into another application on the mobile terminal 204 based on the identifier. In this embodiment, a telephony application will be invoked, and a voice call initiation message will be sent to the service provider, depicted by the voice call origination message 272 sent via the transceiver 210 to the operator network 212.

Further, RFID physical browsing may initiate the placement of rich calls. As is known in the art, rich calls combine different media and services, such as voice, video, and mobile messaging, into a single call session. Various communications techniques, such as Internet Protocol (IP) technology, may be used to provide rich call capability. Accordingly, FIG. 2B shows an RFID tag 252 that provides a rich call service initiation response 274 to the mobile terminal 204.

Upon receiving this service initiation response, the reader application in the mobile terminal 204 feeds the content portion of the tag response 274 to an application on the mobile terminal based on the identifier associated with the tag 252. A rich call application will be invoked, and a rich call origination message will be sent to the service provider. This request is shown in FIG. 2B as the rich call origination message 276, which is sent to the operator network 212.

FIG. 2B also shows that RFID tags may send messages to the mobile terminal 204. For instance, RFID Tag 254 delivers to the mobile terminal 204 a message response 278. The message response 278 includes a content portion containing data formatted as a message (e.g., an SMS message). The reader application in the mobile terminal 204 feeds the content portion of the tag response 278 to an application on the mobile terminal based on the identifier in the response. Existing applications in the mobile terminal 204 may process the data as if the terminal's user had received an SMS message. Other standardized message formats may also be used.

RFID tags may deliver incomplete messages to initiate the transmission of messages by the mobile terminal 204. For instance, RFID tag 256 delivers to the mobile terminal 204 a message initiation response 280. The response 280 includes a content portion that contains a message with blanks. This message may in various formats, such as an SMS message format. Upon receipt of this transmission, the reader application in the mobile terminal 204 feeds the content portion of the tag response 280 to an application on the mobile terminal based on the identifier in the response. This application fills these blanks with data stored in its memory. After these blanks are filled, the mobile terminal 204 transmits a message 282 (e.g., an SMS message) to a service provider via the operator network 212 for use in personalized messaging.

The mobile terminal 204 may store in its memory the data Also referred to as "data items") used to fill such blanks. This data may be in various forms. For example, This data may be formatted according to a markup language, such as XML or HTML.

Alternatively, or in addition thereto, such data may be stored as profile cards or context cards. The user of the mobile terminal 204 may select and activate one or more of these cards in advance or when the application is initiated by the RFID tag.

Cards are discussed in detail in co-pending U.S. patent application Ser. No. 10/174,405, filed on Jun. 17, 2002, entitled "A Method and Device for Storing and Accessing Personal Information." A copy of this application is incorporated herein by reference.

As discussed in that application, the user may select various user data to create and store a variety of cards including "loyalty" cards (e.g., customer relations management cards) and "payment" cards (e.g., credit cards). The cards created and stored by the user also may include "service" cards that either may be specific to a particular event or service (e.g., a particular bookstore or chain of bookstores) or, instead, may be generic for services or events of a particular type (e.g. bookstores in general).

In addition, the cards may include "context" cards that the user may create and use to define his visibility toward services or businesses in a particular context (e.g., being in traffic, being in work, having free time, etc.), and thus, specify the types of services or businesses that he is receptive to receiving information from when in that context. Furthermore, these cards may include "profile" cards that define for example, user preferences for certain types of content.

The blanks in such incomplete messages may each contain a card "template" that specifies various attributes (e.g., NAME) and corresponding fields for specific data. Through a selection application, the portable terminal 204 may either automatically, or by user interaction, select and copy the requested data from card(s) into the appropriate fields of the template and then either transmit the card to the service provider in a service request message or, instead, store it for future use.

The card may be stored with a spatial or temporal trigger associated therewith. Thus, selection of a stored card may occur manually or, alternatively, may occur automatically as a card selected by portable terminal 204 for "suggested" use based on the user's present location or the current date/time.

As is evident from the foregoing, the user of the portable terminal 204 may store a plurality of such cards corresponding to, e.g., a plurality of different loyalty programs, payment methods, services, contexts, and profiles. Thus, the user also may select and copy the requested information from fields corresponding to the same attributes found in cards stored in memory. When the selection of user data is under the user's control, data may be selected such that disclosure does not disclose the user's full identity to the service provider.

Media content, such as audio data may also be delivered by RFID tags. For example, FIG. 2B shows an RFID tag 258 that delivers audio initiation response 284 to the mobile terminal 204. This response includes a content portion that contains audio (e.g., voice) data. The reader application in the mobile terminal 204 feeds the content portion of the tag response 284 to an application on the mobile terminal based on the identifier in the response. This application may be, for example, a media player application that decodes the audio data and outputs it to a user.

Although not shown in FIGS. 2A and 2B, other RFID tags can be associated with other service types and provide different types of content in accordance with the principles of the present invention. For example, RFID tags may deliver content that includes AT command strings, alert SMS messages, or any similar standardized data structures.

Moreover, RFID tags may initiate other requests that the mobile terminal 204 will forward to the operator network 212. Examples of such requests for HTML content, and instant messaging requests that result in the user terminal being able to participate in an instant messaging environment (e.g., a chat room).

Figure 3:
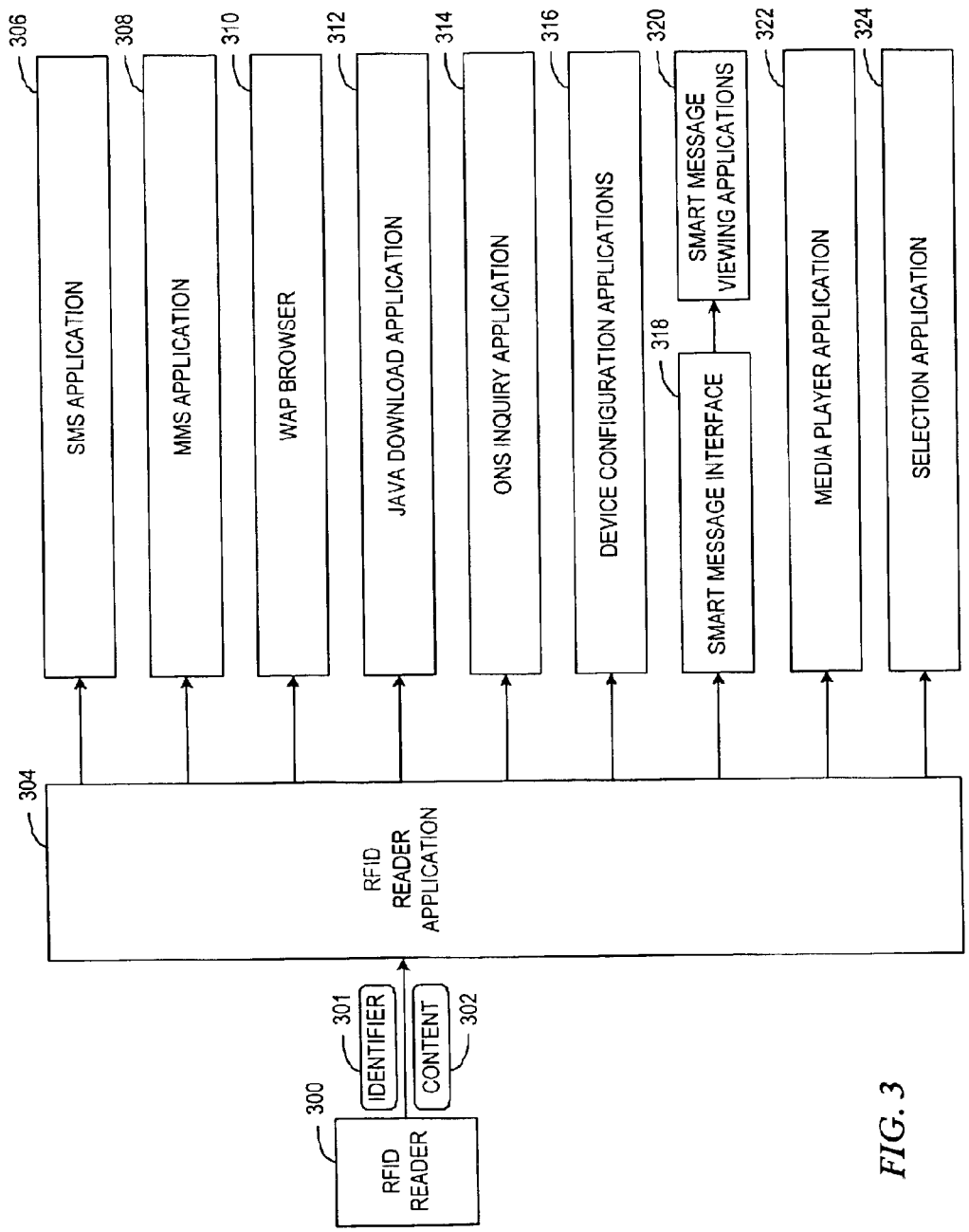
FIG. 3 is a block diagram illustrating one embodiment of a mobile terminal implementation incorporating the physical browsing principles of the present invention.

FIG. 3 is a block diagram illustrating one embodiment of a mobile terminal implementation incorporating the physical browsing principles of the present invention. The mobile terminal is equipped with an RFID reader 300, which includes at least a receiver. After transmitting a signal to activate one or more tag(s), it receives identifier and contact information from the tag. The reader 300 forwards the identifier 301 and content 302 to an RFID reader application 304. The identifier 301 is used to locate an appropriate application to initiate, and the content 302 is used by the located application. For example, the RFID reader application 304 can initiate an SMS application 306 using the identifier 301 to designate the SMS application 306. The content 302 can then be provided to the SMS application 306 for use in the appropriate manner, such as to send an SMS message and SMS service number to the operator network.

The reader application 304 can initiate a wide variety of different types of applications. Applications other than the SMS application 306 include an MMS application 308, WAP browser 310, Java download application 312, ONS inquiry application 314, device configuration applications 316, smart message interface 318 and associated viewer applications 320, and the like. An MMS application 308 identified by the identifier 301 can invite a premium MMS to be provided to the mobile terminal. One manner of effecting this is to notify the mobile terminal of an MMS via an SMS message, and to have the mobile terminal read the MMS content via a WAP browser. This would invoke the WAP browser 310, which in turn initiates a WAP session at a particular URL. The WAP browser 310 would also be initiated where the identifier 301 specifies the WAP browser 310, and provides content 302 such as a URL to the WAP browser to initiate a WAP session at that URL.

A Java download application 312 can be initiated by the appropriate identifier 301, which will initiate a Java download. A number of different variations of information can be stored in the RFID tags as the content 302. More particularly, a Java program typically includes three parts, including 1) class files which are the executable bytecode of a program; 2) the dynamic state of classes (i.e., the serialized state); and 3) deployment descriptors such as Extensible Markup Language (XML) files that, for example, describe how a Java program is to be executed, etc. In a typical Java program deployment, a Java Archive (JAR) file is distributed which includes the class files and the deployment descriptors. With MIDlets, there is a separate deployment descriptor file accompanying the JAR file. The class files, dynamic class state, and deployment descriptors can be stored in RFID tags in different combinations.

As a first example, the serialized information may be included in the tag, along with the URL where the actual bytecode may be retrieved. If the URL is fixed, the same can be done with the class name as a unique identifier, with the Java Virtual Machine classloader downloading the required executable bytecode. As another example, a Java Network Launching Protocol (JNLP) file, which is a Java Webstart launch file of deployment descriptors, can be stored on the tag. The JNLP file includes a description of the program and a URL from which the class files can be downloaded. The mobile terminal can cache the class files in the event that the same program would be started again from a different RFID tag. Another example is to put the bytecode and a deployment description on the tag, possibly in a compressed format to save space. Still another example is to include the code and the serialized information on the tag. This could facilitate sharing of MIDlets between mobile terminal users.

A more particular application using a Java download application 312 is to allow MIDlets, or limited versions referred to herein as "sniplets," to be transferred freely from one mobile device to another. The sniplet itself may or may not offer much value on its own, but it can be used to enable other services. For example, a restaurant might have an RFID tag that distributes a small sniplet containing the name, address, and a menu of the restaurant. If the restaurant is a popular restaurant, people may start storing and taking the sniplets with them to distribute to others.

Such a MIDlet/sniplet can include one or both of the class code and the serialized information. Serialized data contains the class name, which is a unique identifier allowing the receiving device to download the required data from the network. For example, the restaurant sniplet may be as follows:

```
public class RestaurantSniplet extends com.nokia.sniplet.GenericSniplet
{
    String restaurantName;
    String restaurantAddress;
    String restaurantURL;
    String menu;
    public byte[] serialize( );
    public void unserialize(byte[] data);
}
```

The restaurant RFID tag may include information in serialized format such as:

class=com.nokia.sniplet.RestaurantSniplet;
restaurantName=Kabuki;
menu=sushi, 5€

When the mobile terminal receives this serialized data, it will check if it already has a class called "com.nokia.sniplet.RestaurantSniplet" in memory. If it has, it can combine the class and the data into a new instance. In such a case, there is less data and thus bandwidth is saved. For example, if the information associated with one hundred restaurants was saved, the code would only need to be stored in memory once, while the dynamic data would be stored one hundred times. Storing the code only once results in a significant reduction in the required storage.

Returning to FIG. 3, the identifier 301 may also designate an ONS inquiry application 314, where the content 302 would include one or more UPCs or EPCs. In this case the mobile terminal can use, for example, a predetermined WAP gateway address to connect to a broker site where the UPC/EPC is converted to a URL that can be used to obtain information from a WAP server. The retrieved URL can then be used via a browser, such as a WAP browser. The identifier 301 may also designate a device configuration application 316 that will configure settings such as WAP/SMS/MMS settings, profiles, wallpaper, user interface skins, etc. The content 302 would provide the data corresponding to the new configuration.

As previously described, RFID tags may be used to provide configuration data and/or other stand-alone content to the mobile terminal via the RFID reader 300. The identifier 301 will identify an appropriate application, which will be invoked with the assistance of the RFID reader application 304. In one exemplary embodiment, the identifier 301 designates a smart message interface 318 to be invoked, and the content 302 includes any type of content that can be accommodated by a smart message interface. As is known in the art, "smart messaging" is a concept for sending and receiving content over an over-the-air (OTA) message service such as SMS. Using the smart messaging protocol, content such as business cards (e.g., vCard), ring tones, logos, picture messages, Java MIDlets, calendar entries, network access settings, etc. can be sent OTA. Smart messaging is essentially a special type of text message having its own prefixes and codes that makes it possible for a mobile terminal to recognize the message as a functional message rather than a text message directed to the mobile terminal user.

The smart message interface 318 facilitates the proper receipt of RFID tag information provided in accordance with the smart messaging protocol. The tag contains the smart message content 302 (or other content such as EMS content). Once properly received, the mobile terminal can display the content on a local display with the assistance of one or more smart message viewing applications 320. In addition, the mobile terminal user can optionally elect to edit the content and/or forward it to others. Providing content 302 to the mobile terminal using smart messaging is advantageous as not all mobile terminal users are equipped with the physical tools (e.g., digital cameras) or skills required to create visual messages, but they can obtain them from the tags that are strategically located. For example, an RFID tag at a tourist attraction can provide an image associated with that location to the RFID reader 300 using the smart messaging (or other) protocol, thereby instantly providing the tourist with an image of vacation sites that were visited. As another example, a business executive may have an RFID tag in or near his/her office that includes a vCard that can be instantly transmitted to a visitor's mobile terminal using the smart messaging (or other) protocol. A wide variety of other applications exist as well, and the foregoing examples are intended only as representative examples.

As shown in FIG. 3, the mobile terminal implementation further includes a media player application 322. This application provides for the decoding and output of media content such as audio and video.

A selection application 324 may be employed by each of applications 306–322. Selection application selects data items to be included in service requests. Details regarding the selection of data items are provided below with reference to FIG. 8.

Figure 4:
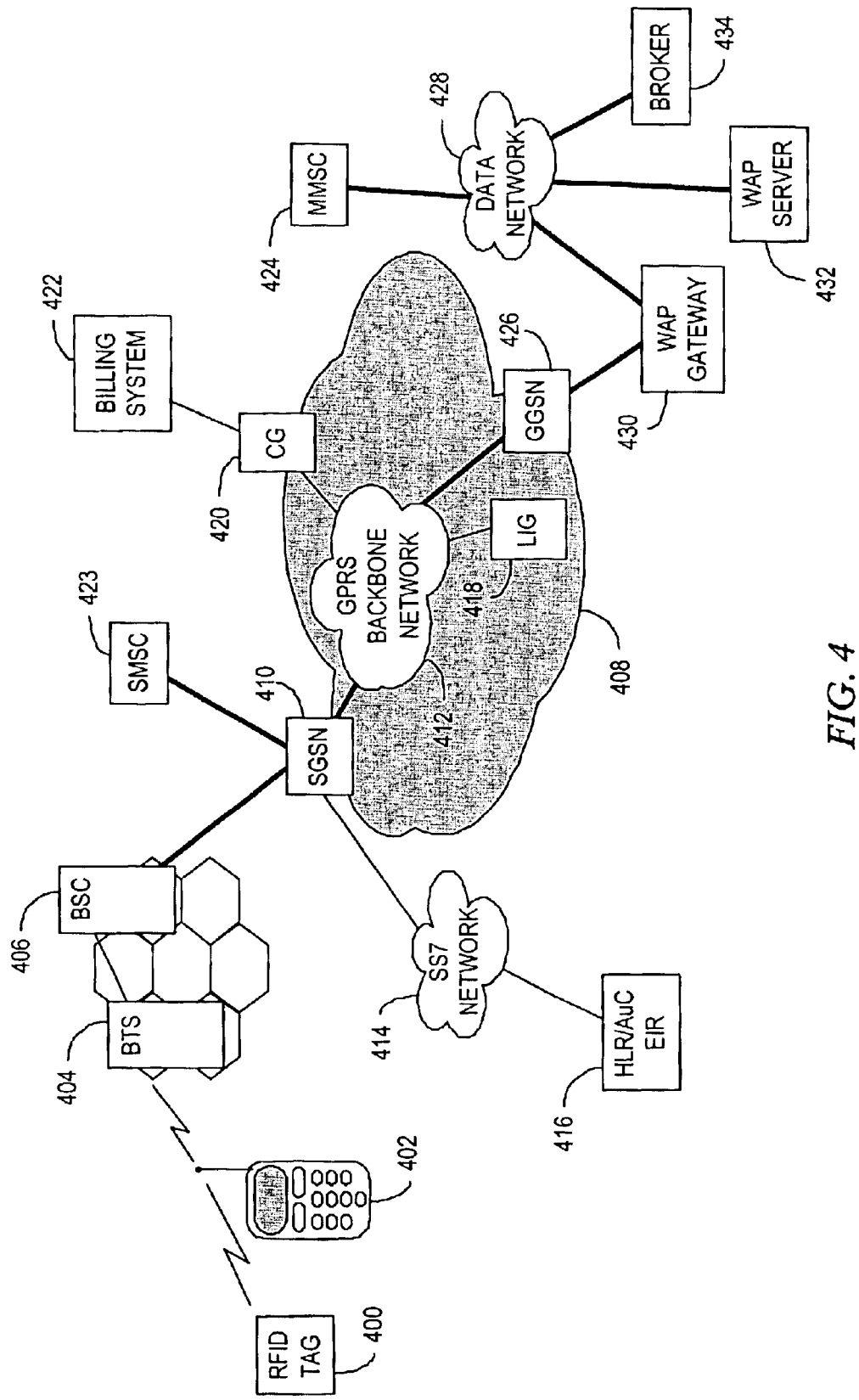
FIG. 4 is a diagram illustrating an exemplary embodiment of a system-level implementation of RFID-based service initiation of message services including SMS, EMS, and MMS.

FIG. 4 is a diagram illustrating an exemplary embodiment of a system-level implementation of RFID-based service initiation of message services including SMS, EMS, and MMS. These service types involve communication with an operator network after the mobile terminal has communicated with the RFID tag and obtained the tag content. As described in connection with FIGS. 2A and 2B, the RFID tag 400 may provide an SMS, MMS, etc. service initiation response to the mobile terminal 402 that has come within a certain proximity of the tag 400. The tag information is read into the mobile terminal 402 via its reader, and the reader application invokes the appropriate SMS, MMS, etc. application based on the identifier provided by the tag 400. The SMS/MMS application will then need to communicate with the operator network in order to receive the message corresponding to the SMS/MMS invitation.

The SMS/MMS embodiment described herein is applicable in any number of network systems. For purposes of illustration and not of limitation, FIG. 4 is described in the context of a General Packet Radio System (GPRS) mobile communications network. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIGS. 4 and 5 are generally described in connection with GPRS, and GSM which is the underlying digital technology of GPRS, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 4, the mobile terminal 402 communicates with the base transceiver station (BTS) 404 via an air interface. The BTS 404 is a component of the wireless network access infrastructure that terminates the air interface over which subscriber traffic is communicated to and from the mobile terminal 404. The Base Station Controller (BSC) 406 is a switching module that provides, among other things, handoff functions, and controls power levels in each BTS 404. The BSC 406 controls the interface between a Mobile Switching Center (MSC) (not shown) and BTS 404 in a GSM wireless network 408, and thus controls one or more BTSs in the call set-up functions, signaling, and in the use of radio channels. The BSC 406 also controls the interface between the Serving GPRS Support Node (SGSN) 410 and the BTS 404 in a GPRS network 412.

The Serving GPRS Support Node (SGSN) 410 serves GPRS mobile by sending or receiving packets via a Base Station Subsystem (BSS), and more particularly via the BSC 406 in the context of GSM systems. The SGSN 410 is responsible for the delivery of data packets to and from the mobile terminals 402 within its service area, and performs packet routing and transfer, mobility management, logical link management, authentication, charging functions, etc. In the exemplary GPRS embodiment shown in FIG. 4, the location register of the SGSN 410 stores location information such as the current cell and Visiting Location Register (VLR) associated with the terminal 402, as well as user profiles such as the International Mobile Subscriber Identity Number (IMSI) of all GPRS users registered with this SGSN 410.

The SGSN 410 may also connect to a Signaling System 7 (SS7) network 414, which is a system on the Public Switched Telephone Network (PSTN) that performs out-of-band signaling in support of the call establishment, billing, routing, and information exchange functions of the PSTN. The SS7 network 414 communicates with network elements such as an Authentication Center (AuC), Home Location Register (HLR), Equipment Identity Register (EIR), etc., collectively shown at block 416. The network 408 may include other network elements, such as a Lawful Interception Gateway (LIG) 418 that allows authorities to intercept GPRS mobile data calls, and a Charging Gateway (CG) 420 that serves as an intermediary with various Operations Support Systems (OSS) elements such as charging and billing systems 422.

An SGSN 410 is ultimately coupled to a Short Message Service Center (SMSC) 423 and/or Multimedia Message Service Center (MMSC) 424 in connection with the presently described embodiment. While GSM forms the underlying technology, the SGSN 410 described above is a network element introduced through GPRS technology. Another network element introduced in the GPRS context is the Gateway GPRS Support Node (GGSN) 426, which acts as a gateway between the GPRS network 412 and a packet switched public data network, such as network 428. This gateway 426 allows mobile subscribers to access the public data network 428 or specified private IP networks. The connection between the GGSN 426 and the public data network 428 is generally enabled through a standard protocol, such as the Internet Protocol (IP), and further may be coupled through a WAP gateway 430.

With the aforementioned network system described as a representative network environment, the SMS/MMS physical browsing embodiment is now described. The content portion provided by the RFID tag 400 is read to the mobile terminal 402, which in turn invokes an MMS or SMS application that sends an SMS message and premium SMS number to the service provider. In the case of inviting an SMS message, the SMS will ultimately be delivered by the SMSC 423 to the mobile terminal 402. In the case of inviting an MMS message, an SMS message may notify the user of the MMS message which can be read at the mobile terminal 402 via a browser, such as a WAP browser. In either case, the content of the message received via the SMSC 423 or MMSC 424 can include advertisements, entertainment, ticket information, etc.

In the case where the RFID tag 400 identifies a WAP browser as the targeted application and provides a URL as content, the mobile terminal 402 will initiate the WAP browser and transmit the URL to the network. In one embodiment, the mobile terminal 402 may include a preset WAP gateway address for the WAP gateway 430 to connect to the specified URL at the WAP server 432. The RFID tag 400 could, in some embodiments, also provide the WAP gateway address.

In the case where the RFID tag 400 identifies an application to generate an ONS request and provides a UPC or EPC as the content, the mobile terminal 402 will issue such a request to the network. In one embodiment, the mobile terminal 402 may include a preset WAP gateway address of the WAP gateway 430, or the RFID tag 400 may also provide the WAP gateway address. The mobile terminal 402 uses this address to connect to a broker site 434 identified by a first URL that may be provided with the tag 400 content, where the UPC/EPC is converted to a second URL based on the subscription of service or other predetermined parameter. The information is then obtained using the second URL from the WAP server 432.

The manner in which the identifiers and content is provided to the mobile terminal reader may vary in accordance with the present invention. For example, variations of existing protocols may be used, such as the smart messaging protocol described above in connection with RFID tags providing stand-alone content, or the Narrow Band Socket (NBS) protocol. Tag data can therefore be provided in an extended NBS format where, in addition to standard NBS fields, other information associated with the present invention may be provided such as service type (e.g., SMS, MMS, WAP, etc.), tariff classes (e.g., free, fee-based, etc.), RFID content lengths, as well as the content itself. FIG. 5 illustrates a general diagram of an exemplary tag information block 500, which may be implemented as shown or as a basis in connection with other known formats or protocols in order to provide the requisite information from the RFID tag to the mobile terminal reader.

In the exemplary embodiment of FIG. 5, the information block 500 includes the identifier 502 used to identify an application on the mobile terminal that is to be initiated. In the illustrated embodiment, two bytes of information are reserved for the identifier (ID NUMBER). One embodiment includes providing a content type 504, which defines the type of content that is provided via the RFID tag. For example, the content types may include SMS, MMS, URL for use with WAP browsing, Java program download request and/or Java programs (e.g., MIDlets), UPC/EPC, smart message, and the like. Each of these and other content types can be identified via the content type field 504.

Where fees may be associated with a service request, the RFID information block 500 may include tariff information 506. For example, a 00H may represent that there is no associated cost. The remaining possible values are of a tariff class (or undefined) to be set by the service operator, where the actual cost may be printed visually on the RFID tag. The actual price need not be stored on the RFID tag, but rather just the tariff class. By providing tariff information 506 within the RFID tag, a user can selectively put his/her mobile terminal into a mode where fee-based services will not be used. Companies who provide mobile terminals to their employees may also find this to be quite beneficial. This also provides the user with the option of selecting a threshold cost that is willing to be paid, such as a 1 Euro limit. In this manner, RFID tags identifying a fee can automatically be identified at the mobile terminal as being within or outside of the predefined limit. The fee information can ultimately be displayed to the user via the mobile terminal display. Such limits may be based on information other than cost that is provided with the tag information 500, such as the content type itself. The mobile terminal can, for example, reject certain graphics or images where the user does not want to store memory-intensive content. Other parameters not shown in FIG. 5 that enable the user to set certain limits or thresholds may also be provided via an RFID tag.

The tag information block 500 may also include a content length field 508, which indicates the length of the content 510 portion of the tag information. Representative types of content that can be included as content 510 in the tag information 500 have been previously described. For instance, content field 510 may contain data formatted as a message, such as an SMS or MMS message.

An optional certificate field 512, illustrated as one octet but of any desired length, may be provided. This field 512 may be used, for example, to provide an electronic signature to guarantee authenticity of the service provider, from which the user may access the public key location and verify the signature based on Public Key Infrastructure (PKI) policies. A check sum field, such as Cyclic Redundancy Check (CRC) field 514, may also be provided with the tag information 500. The CRC information may be used to determine whether errors occurred in connection with the reading of the tag information 500. Other and/or different information may also be provided, as the present invention contemplates any number of different tag content types, formats, fields, etc.

For example, instead of, or in addition to, application identifiers, RFID tags may provide location identifiers to mobile terminal readers. The tag provider may have a list or a mapping of the tag IDs to a location within his premises. Portable terminals may pass these location identifiers along to service providers in service requests. If the service provider receives a request, message, or call containing a tag's location identifier, the service provider knows that the user is at a certain location.

The ID of the tag may be globally unique so that each service provider has a set of uniquely numbered tags, which he may place at his premises. Thus, the unique number can be thought as an address, like a media access control (MAC) address. In this case, the content of the tag and not the ID of the tag will convey information regarding the application that the tag's response will initiate. Alternatively, a location indicator may be stored in tag content field 510.

Moreover, the content data of the tag may be formatted according to a markup language such as XML or the Hypertext Markup Language (HTML). Such content data may be either compressed or uncompressed.

Figure 6:
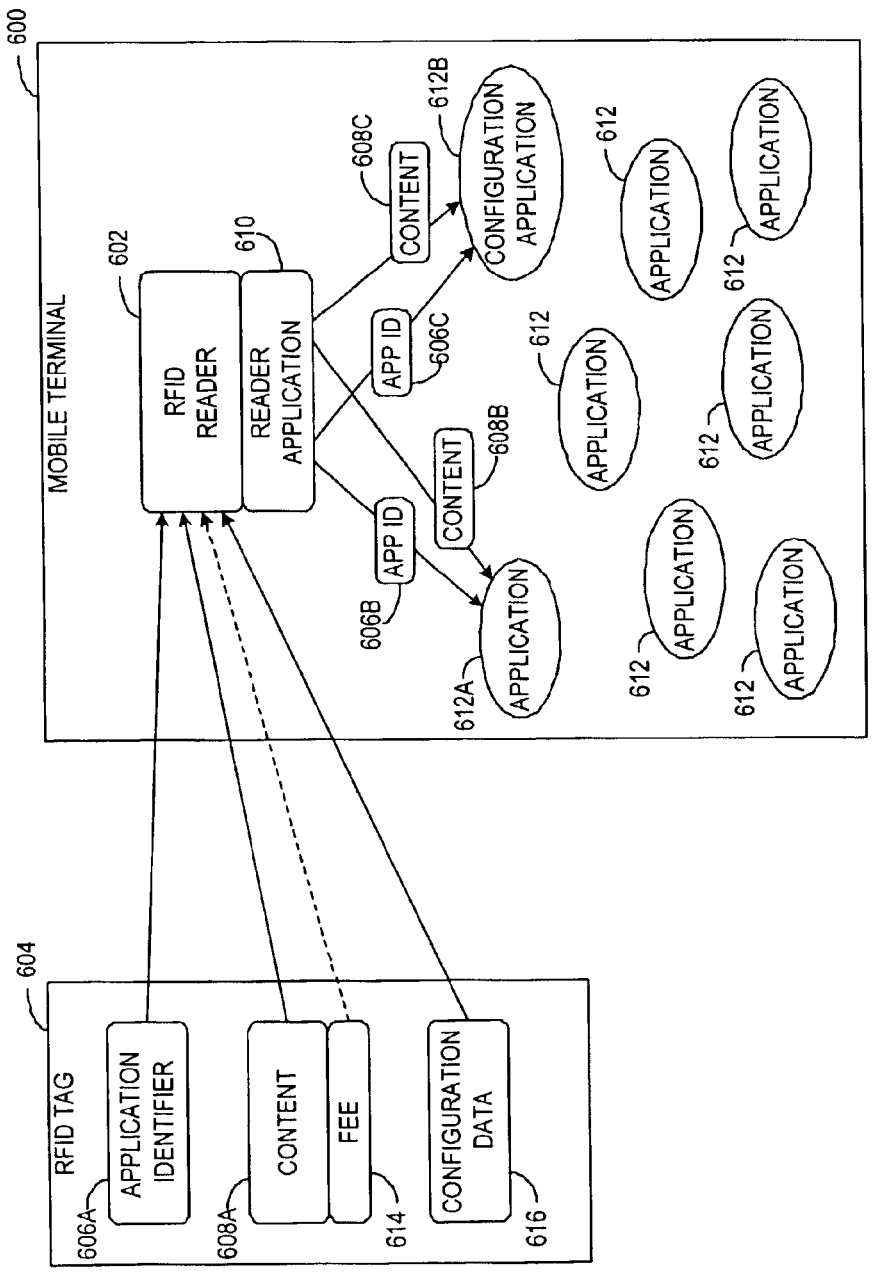
FIG. 6 is a block diagram illustrating exemplary manners in which RFID identifiers and content as described above are used by a mobile terminal reader and reader application to invoke a particular application and initiate the corresponding action.

FIG. 6 is a block diagram illustrating exemplary manners in which RFID identifiers and content as described above are used by a mobile terminal reader and reader application to invoke a particular application and initiate the corresponding action. The mobile terminal 600 includes an RFID reader 602, which receives information from the RFID tag 604. As previously described, the RFID tag 604 may be an active or passive tag. Assuming a passive tag 604, the mobile terminal 600 will initiate a signal that is recognized by the tag 604 when the mobile terminal 600 is within a certain distance of the tag 604. The tag 604 will respond with at least an application identifier (ID) 606A and some form of content 608A. The RFID reader 602 receives the application ID 606A and content 608A, such as via a receiver or transceiver. A reader application 610 receives the application ID and content from the reader 602, and invokes one (or more) of a plurality of potential applications 612. It is also possible that only one application resides on the mobile terminal. Using the application ID 606B, the appropriate application 612 can be invoked, such as the SMS application 612A. The associated content 608B is also provided for use by the application 612A. Each application 612 is uniquely identified so that the correct application 612 may be invoked using the application ID 606B. The "content" as used in connection with FIG. 6 may include other information such as fee information 614, as described in connection with FIG. 5.

In another embodiment, the content provided is in the form of configuration data 616. The RFID reader 602 receives the application ID 606A and the configuration data 616, and provides this information to the reader application 610. In turn, the reader application invokes the appropriate configuration application 612B using the application ID 606C and the content/configuration data 608C. Again, the application ID 608C uniquely identifies the appropriate application resident on the mobile terminal 600, or otherwise accessible to the mobile terminal 600.

Figure 7:
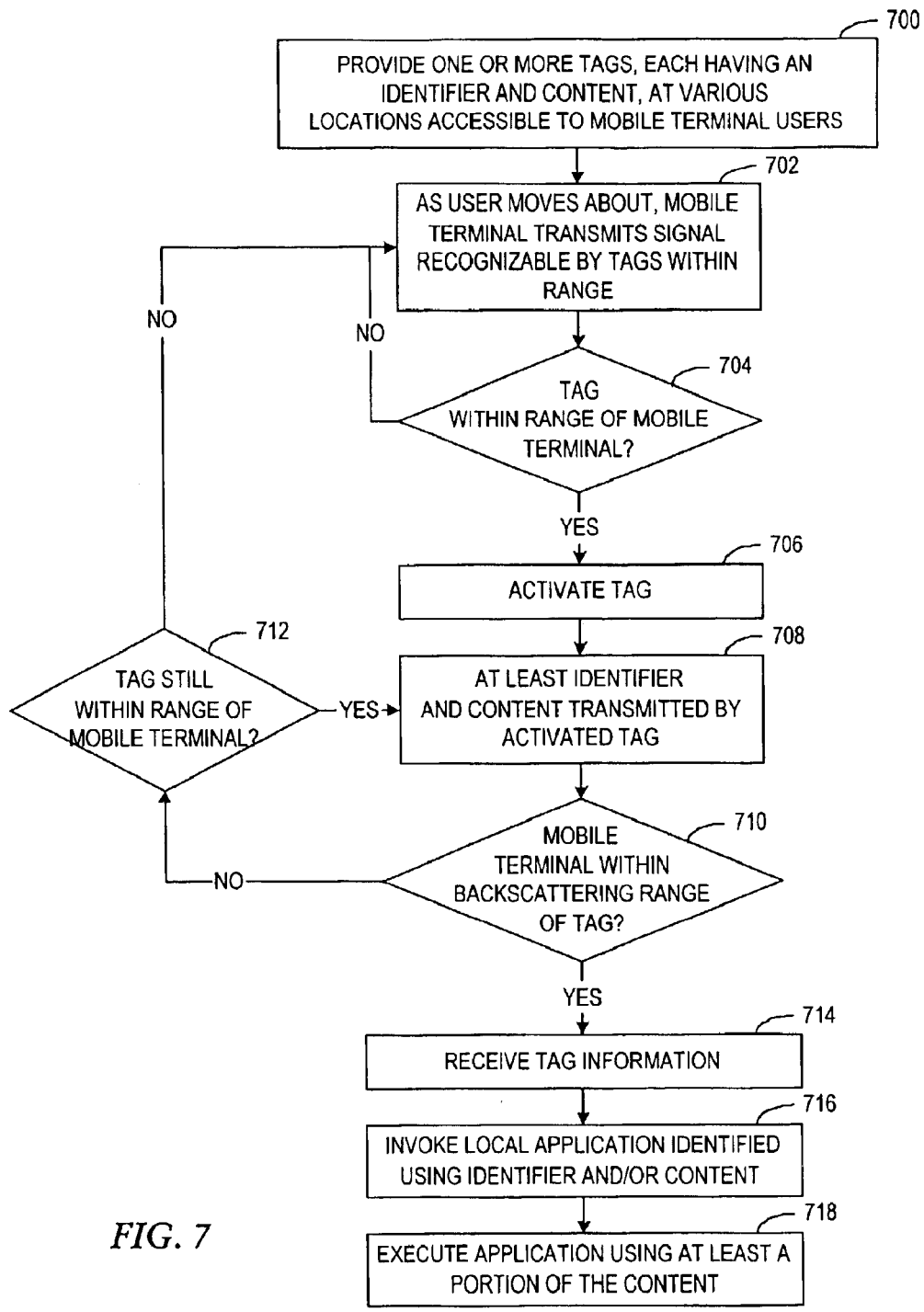
FIG. 7 is a flow diagram of an exemplary method for locating information via physical browsing by a mobile terminal in accordance with the present invention.

FIG. 7 is a flow diagram of an exemplary method for locating information via physical browsing by a mobile terminal in accordance with the present invention. One or more tags are provided 700, where each tag includes an identifier and associated content. These tags can be provided at various locations that are accessible to mobile terminal users. As the user physically moves about with his/her mobile terminal, the mobile terminal can continuously, periodically, or at manually or automatically designated times transmit 702 a signal that is recognizable by the tags within the range of the signal. If a particular tag is within this range as determined at decision block 704, the tag is activated 706, and at least the application identifier and the content is transmitted 708 by the activated tag.

Because the transmission range of the mobile terminal and the backscattering range of the tag are not necessarily the same, it is determined 710 whether the mobile terminal is within the backscattering range of the tag. If not, the backscattering range may be less than the range of the mobile terminal, or the user may have moved out of range. If the tag is not still within range of the mobile terminal as determined at decision block 712, this would indicate that the user has moved away from the tag, and the process returns to block 702. If the tag is still within the range of the mobile terminal, the identifier and content are transmitted 708 by the activated tag until the mobile terminal comes within the backscattering range. When the mobile terminal receives 714 the tag information, an identified local application identified is invoked 716. The application may be identified through the tag's identifier. Alternatively, when the tag's identifier indicates its location, the application is identified through the content provided by the tag. The application is executed 718 using at least a portion of the content provided by the tag, as previously set forth in the description herein.

As described above, through encounters with RFID tags, mobile terminals may receive information, such as identifiers and content data. From this received information, the mobile terminals may generate service requests that are sent to service providers.

For example, as described above with reference to FIGS. 2A and 2B, a mobile terminal may generate SMS push requests, MMS push requests, WAP requests, and requests for Java content. Such messages may be based on incomplete messages contained in content data fields of tag-originated responses. Upon receiving an incomplete message, a mobile terminal "completes" the message by selecting stored data items, such as card(s), for insertion into the message. Alternatively, a mobile terminal may generate service requests (e.g., SMS push requests, MMS push requests, WAP requests, and Java requests) simply from messages to generate such requests, and not from "incomplete" messages. In this case as well, the mobile terminal may select stored data items for inclusion in the generated request. These data items may be selected according to one or more criteria.

Data items may designate information desired by a terminal user, such as pricing data and scheduling information.

Data items may also include personal information such as hobbies, interests, age, and profession. Data items may also include specific network addresses to target service requests, such as telephone numbers and URLs.

Figure 8:
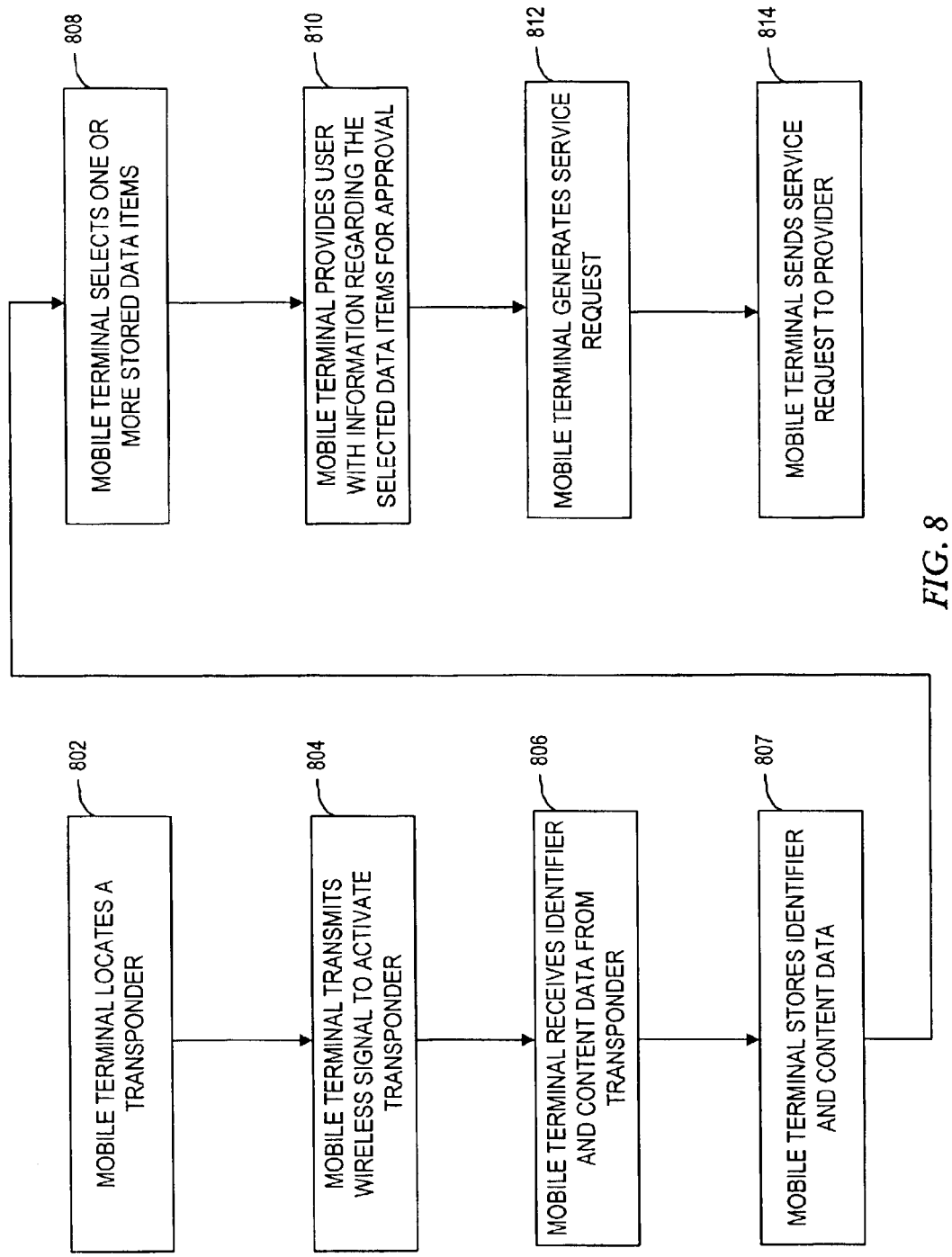
FIG. 8 is a flowchart of an operational sequence involving the selection of data items, in accordance with the present invention.

FIG. 8 is a flowchart illustrating an operational sequence involving a mobile terminal, such as the mobile terminal 204 placing a service request that includes selected data items. As shown in FIG. 8, this sequence begins with a step 802. In this step, the mobile terminal locates a transponder (e.g., an RFID tag) at a location that is, for example, substantially accessible to a user of the mobile terminal.

Next, in a step 804, the mobile terminal transmits a wireless signal to activate the transponder. In a step 806, the mobile terminal receives information from the transponder when it is located within a wireless transmission range of the transponder. This information may be received through a backscatter transmission. The received information includes at least an identifier and content data associated with the transponder.

An optional step 807 may follow step 806. In step 807, the mobile terminal stores the received identifier and content data in memory.

In a step 808, the mobile terminal selects one or more of its stored data items. This selection is based on the received identifier and/or the received content data. One or more criteria may be used to perform this selection. Examples of such criteria include the received identifier, the received content data, one or more conditions associated with the stored data items, and one or more conditions set by the user of the mobile terminal.

The received identifier and/or the received content data may be used to select content items. For example, the portable terminal may store RFID tag ID and content data associated with several tags. The user may authorize such information for certain times and/or locations so that user specific information is not transmitted unless based on an RFID tag encounter within an authorized time and/or location.

The selection of data items may be selected on conditions associated with the stored data items. For example, certain data items stored by the portable terminal may have time associated time conditions. For instance, certain types of user activities correspond to different times of the day and different days of the week. Accordingly, certain information may selected to reflect whether, for example, the user is at work or at play. The security conditions associated with each data item may be user-selected.

Also, certain data items may have associated security conditions. For example, certain data items may only be selected when responses are received from tags that are designated as being known or "trusted" tags.

The selection of data items may also be based on conditions set by the user of the mobile terminal. Such conditions may be in the form of user-selected preferences that are employed when a tag provides the mobile terminal with alternatives. For instance, the content of the tag may comprise information, which when combined with preference data stored on the user's mobile device, determines the selection of data items. For example, content data received from a tag may include a plurality of destination addresses, such as phone numbers. Based on user selected phone number preferences, the mobile terminal determines to which number (i.e., data item) a call is made. Similarly, content data received from a tag may include a plurality of URLs. Based on user-selected preferences, the mobile terminal selects a URL to be used in a WAP request.

Such preferences may be stored by portable terminals as, for example, context cards and/or profile cards. To support a variety of such preferences, a portable device may store multiple cards to enable a user to change preferences by activating different cards.

After step 808, an optional step 810 may performed. In this step, the portable terminal may provide information regarding the selected data items to the user for approval. In a step 812, a service request is generated based on the selected data items. If step 808 is performed, the service request is generated only if an indication of approval through the terminal's user interface. In a step 814 the generated service request is sent to a service provider. The data items selected during this operation may be used as input data for one or more subsequent service requests. Accordingly, the user may be shown (e.g. with an icon), which data items (e.g., profile and context cards) are currently selected and activated.

The sequence of FIG. 8 may be employed in many applications. One such application is product marketing. For example, a tag's content data may comprise information such as the identity of a company or enterprise, such as a reseller. When the tag is activated, it provides information regarding the reseller's geographical address, makes a contact to the reseller's Internet site, places a phone call to the reseller, and/or sends an SMS message to the reseller. In response to these transmissions, the user may receive "best buy" suggestions from the reseller. The reseller may select these suggestions from any received user profile and/or context information. In embodiments, the user may select whether to use his profile/context data or only a selected part of it. This selections may be performed in advance of RFID tag encounters or during each encounter.

Figure 9:
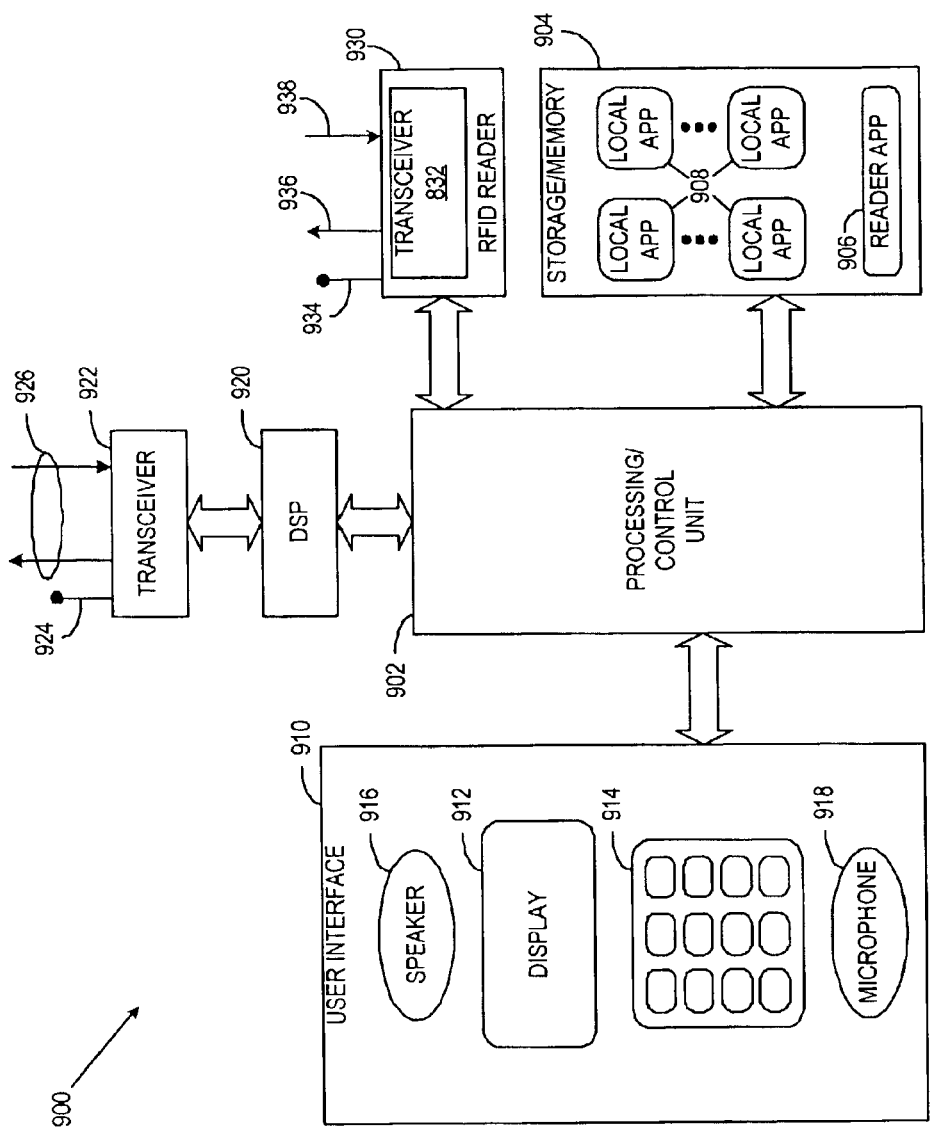
FIG. 9 illustrates a representative mobile terminal computing system capable of carrying out operations in accordance with the invention.

The mobile terminals described in connection with the present invention may be any number of wireless devices incorporating user profile information, such as wireless/cellular telephones, personal digital assistants (PDAs), or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various functions, display presentations and operations described herein. An example of a representative mobile terminal computing system capable of carrying out operations in accordance with the invention is illustrated in FIG. 9.

The exemplary mobile computing arrangement 900 suitable for performing the operations in accordance with the present invention includes a processing/control unit 902, such as a microprocessor, reduced instruction set computer (RISC), or other central processing module. The processing unit 902 need not be a single device, and may include one or more processors. For example, the processing unit may include a master processor and associated slave processors coupled to communicate with the master processor.

The processing unit 902 controls the basic functions of the mobile terminal as dictated by programs available in the program storage/memory. Thus, the processing unit 902 executes the functions associated with the physical browsing aspects of the present invention. More particularly, the program storage/memory 904 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The physical browsing modules associated with the present invention, such as the reader application 906 and local applications 908 that may be identified by application identifiers and invoked, may also be transmitted to the mobile computing arrangement 900 via data signals, such as being downloaded electronically via a network, such as the Internet and intermediary wireless networks.

The program storage/memory 904 may also be used to store data, such as the content provided by an RFID tag. In one embodiment of the invention, the content is stored in non-volatile electrically-erasable, programmable ROM (EEPROM), flash ROM, etc. so that the content is not lost upon power down of the mobile terminal.

The processor 902 is also coupled to user-interface 910 elements associated with the mobile terminal. The user-interface 910 of the mobile terminal may include, for example, a display 912 such as a liquid crystal display, a keypad 914, speaker 916, and microphone 918. These and other user-interface components are coupled to the processor 902 as is known in the art. The keypad 914 includes alpha-numeric keys for performing a variety of functions, including dialing numbers and executing operations assigned to one or more keys. For example, in accordance with the present invention, various functions associated with the network communications may be initiated and/or carried out by using the keypad 914. Alternatively, other user-interface mechanisms may be employed, such as voice commands, switches, touch pad/screen, graphical user interface using a pointing device, trackball, joystick, or any other user interface mechanism.

The mobile computing arrangement 900 may also include a digital signal processor (DSP) 920. The DSP 920 may perform a variety of functions, including analog-to-digital (A/D) conversion, digital-to-analog (D/A) conversion, speech coding/decoding, encryption/decryption, error detection and correction, bit stream translation, filtering, etc. The transceiver 922, generally coupled to an antenna 924, transmits and receives the radio signals 926 between the wireless device and the network.

In connection with the present invention, the mobile computing arrangement 900 includes an RFID reader device 930, which includes a transceiver 932 and an antenna 934. The reader 930 transmits signals 936 which can be recognized by tags, thereby activating the tags. In response, the tags provide tag information signals 938, including the application identifier and content, which are provided to the reader application 906. The reader application determines which of the local applications 908 is to be invoked, based on the application identifier. The reader application 906 also provides the content to the appropriate application 908, once the appropriate application 908 has been identified. It should be recognized that the transceiver 922 used to establish wireless connections between the mobile device and the network can be used as the transceiver 932 associated with the RFID reader 930. However, because the transmissions performed with the network are high-frequency signals relative to the RF signals used in connection with the RFID reader 930, it may not be practical or possible to share the transceiver, although it is possible in some implementations.

The mobile computing arrangement 900 of FIG. 9 is provided as a representative example of a computing environment in which the principles of the present invention may be applied. From the description provided herein, those skilled in the art will appreciate that the present invention is equally applicable in a variety of other currently known and future mobile computing environments. For example, the physical browsing software modules in accordance with the present invention may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, it will be apparent to those skilled in the art from the foregoing description that the invention is equally applicable to other current or future radio frequency identification technologies using, for example, electromagnetic/electrostatic coupling, and thus the present invention is not limited to "RFID" technology as this term is currently used. It is intended that the scope of the invention be limited not with this detailed description, but rather by the claims appended hereto.

What is claimed is:

1. A method in an electronic device, comprising:

activating a transponder, having at least an identifier and content data associated therewith, via a wireless signal transmitted by the electronic device, said identifier associated with at least one application;

receiving at least the identifier and the content data from the activated transponder at the electronic device when the electronic device is physically located within a wireless transmission range of the transponder; and selecting one or more stored data items in the electronic device and invoking the at least one application, based on the application's association with said ifentifier, according to one or more criteria, including at least one of:

(i) the received identifier,
(ii) one or more conditions associated with the stored data items, and
(iii) one or more conditions set by the user of the electronic device.

2. The method of claim 1, further comprising the steps of:
generating the service request based on the one or more selected data items; and
sending the service request to a service provider.

3. The method of claim 2, wherein the service request is a Short Message Service (SMS) push request.

4. The method of claim 2, wherein the service request is a Multimedia Message Service (MMS) push request.

5. The method of claim 2, wherein the service request is a Wireless Application Protocol (WAP) request.

6. The method of claim 2, wherein the service request is a request for hypertext markup language (HTML) content.

7. The method of claim 2, wherein the service request is an instant messaging request.

8. The method of claim 1, wherein step (d) comprises initiating a selection application stored at the electronic device.

9. The method of claim 8, wherein the selection application is initiated by the user of the electronic device.

10. The method of claim 8, wherein the selection application is initiated automatically.

11. The method of claim 1, wherein the one or more conditions associated with the stored data items are stored in the electronic device as cards.

12. The method of claim 1, wherein the one or more conditions set by the user of the electronic device are set before the electronic device receives at least the identifier and the content data from the activated transponder.

13. The method of claim 1, further comprising:
providing information regarding the selected data items to the user for approval;
generating the service request based on the selected data items upon receipt of an approval indication from the user.

14. The method of claim 1, further comprising:
storing the received identifier and content data from the transponder at the electronic device.

15. The method of claim 1, wherein selecting the one or more of the stored data items comprises:
associating the received identifier with at least one application residing at the electronic device; and
invoking, based on the association, the at least one application.

16. The method of claim 15, further comprising:
feeding at least part of the received contact data to the at least one invoked application.

17. The method of claim 1, wherein the service request is a JAVA midlet request.

18. The method of claim 1, further comprising selecting the tag for activation based on one or more characteristics of the tag.

19. The method of claim 18, wherein the one or more characteristics includes a location of the tag.

20. The method of claim 1, wherein the electronic device selects data items to be included in a service request through an encounter with the transponder.

21. A system in an electronic device, comprising:
means for activating a transponder, having at least an identifier and content data associated therewith, via a wireless signal transmitted by the electronic device, said identifier associated with at least one application.

means for receiving at least the identifier and the content data from the activated transponder at the electronic device when the electronic device is physically located within a wireless transmission range of the transponder; and means for selecting one or more stored data items in the electronic device and invoking the at least one application, based on the application's association with said identifier, according to one or more criteria, including at least one of:
(i) the received identifier,
(ii) one or more conditions associated with the stored data items, and
(iii) one or more conditions set by the user of the electronic device.

22. The system of claim 21, further comprising:
means for generating the service request based on the one or more selected data items; and
means for sending the service request to a service provider.

23. The system of claim 22, wherein the service request is a Short Message Service (SMS) push request.

24. The system of claim 22, wherein the service request is a Multimedia Message Service (MMS) push request.

25. The system of claim 22, wherein the service request is a Wireless Application Protocol (WAP) request.

26. The system of claim 22, wherein the service request is a request for hypertext markup language (HTML) content.

27. The system of claim 22, wherein the service request is an instant messaging request.

28. The system of claim 21, wherein said means for selecting comprises means for initiating a selection application stored at the electronic device.

29. The system of claim 28, wherein the selection application is initiated by the user of the electronic device.

30. The system of claim 28, wherein the selection application is initiated automatically.

31. The system of claim 21, wherein the one or more conditions associated with the stored data items are stored in the electronic device as card.

32. The system of claim 21, wherein the one or more conditions set by the user of the electronic device are set before the electronic device receives at least the identifier and the content data from the activated transponder.

33. The system of claim 21, further comprising:
means for providing information regarding the selected data items to the user for approval; and
means for generating the service request based on the selected data items upon receipt of an approval indication from the user.

34. The system of claim 21, wherein the selection application is initiated by the user of the electronic device.

35. The system of claim 21, wherein said means for selecting comprises:
means for associating the received identifier with at least one application residing at the electronic device; and
means for invoking, based on the association, the at least one application.

36. The system of claim 35, further comprising:
means for feeding at least part of the received content data to the at least one invoked application.

37. The system of claim 21, wherein the service request is a JAVA midlet request.

38. The system of claim 21, further comprising means for selecting the tag based on one or more characteristics of the tag.

39. The system of claim 38, wherein the one or more characteristics includes a location of the tag.

40. The system of claim 21, wherein the electronic device selects data items to be included in a service request through an encounter with the transponder.

41. An apparatus comprising:
   a radio frequency identification (RFID) reader module configured to receive information from an RFID device physically located within a coverage area of the RFID reader module, the received information comprising at least an identifier in the RFID device and content data associated therewith, said identifier associated with at least one application;
   a memory configured to store various data items and/or applications; and
   a controller configured to select at least one of the stored data items and invoking the at least one application, based on the applicaiton's association with said identifier, based on one or more criteria, including (i) the received identifier, (ii) one or more conditions associated with the stored data items, and (iii) one or more conditions set by a user of the apparatus.

42. The apparatus of claim 41, further comprising a cellular network interface configured to send a service request to a service provider, wherein the service request is based on the at least one selected data item.

43. An apparatus, comprising:
   means for receiving information from a transponder physically located within a coverage area of the means for receiving, the received information comprising at least an identifier in the transponder and content data associated therewith, said identifier associated with at least one application;
   means for storing various data items and/or applications; and
   means for selecting at least one of the stored data items and invoking the at least one application, based on its association with said identifier, based on one or more criteria, including (i) the received identifier, (ii) one or more conditions associated with the stored data items, and (iii) one or more conditions set by a user of the apparatus.

44. A computer-readable medium having computer-executable components, for use in an electronic device, comprising:
   a computer-executable component of said computer-readable medium for activating a transponder, having at least an identifier and content data accociated therewith, via a wireless signal transmitted by the electronic device, said identifier associated with at least one application;
   a computer-executable component of said computer-readable medium for receiving at least the identifier and the content data from the activated transponder at the electronic device when the electronic device is physically located within a wireless transmission range of the transponder; and
   a computer-executable component of said computer-readable medium for selecting one or more stored data items in the electronic device and invoking the at least one application, based on the application's association with said identifier, according to one or more criteria, including at least one of:
   (i) the received identifier,
   (ii) one or more conditions associated with the sotred data items, and
   (iii) one or more conditions set by the user of the electronic device.

* * * * *